US011679393B2

(12) United States Patent
Bockhoff et al.

(10) Patent No.: US 11,679,393 B2
(45) Date of Patent: Jun. 20, 2023

(54) SYSTEM AND METHOD FOR TREATING A COMBINATION OF A LIQUID AND GRANULAR MATTER

(71) Applicant: TREBO APS, Søborg (DK)

(72) Inventors: Andreas Leth Bockhoff, Søborg (DK); Thomas Trebbien, Søborg (DK)

(73) Assignee: TREBO APS, Søborg (DK)

( * ) Notice: Subject to any disclaimer, the term of this patent is extended or adjusted under 35 U.S.C. 154(b) by 43 days.

(21) Appl. No.: 17/312,070

(22) PCT Filed: Dec. 12, 2019

(86) PCT No.: PCT/DK2019/050386
§ 371 (c)(1),
(2) Date: Jun. 9, 2021

(87) PCT Pub. No.: WO2020/119873
PCT Pub. Date: Jun. 18, 2020

(65) Prior Publication Data
US 2022/0023874 A1    Jan. 27, 2022

(30) Foreign Application Priority Data

Dec. 14, 2018  (DK) .............................. PA201870817
Aug. 23, 2019  (DK) .............................. PA201900998

(51) Int. Cl.
*B03B 5/18*    (2006.01)
*B03B 5/24*    (2006.01)

(52) U.S. Cl.
CPC . *B03B 5/18* (2013.01); *B03B 5/24* (2013.01)

(58) Field of Classification Search
CPC ................ B03B 5/10; B03B 5/18; B03B 5/24
(Continued)

(56) References Cited

U.S. PATENT DOCUMENTS 4,563,271 A * 1/1986 Schroder ................... B03B 5/18
                                                        209/489
4,772,384 A * 9/1988 Schonert ................... B03B 5/24
                                                        209/486
4,778,219 A * 10/1988 Wilczynski ............... B03B 5/24
                                                        299/8

FOREIGN PATENT DOCUMENTS

CA        2438021 A1      8/2002
CN       102698863        10/2012
(Continued)

OTHER PUBLICATIONS

Written Opinion and Search Report for corresponding International Application No. PCT/DK2019/050386, dated Jan. 20, 2020. 20 pages.

*Primary Examiner* — Terrell H Matthews
(74) *Attorney, Agent, or Firm* — Leason Ellis LLP

(57) ABSTRACT

There is provided a system for treating a combination of a liquid and granular matter, which granular matter is larger than or equal to a minimum grain size and comprises two or more types of granular matter with different densities, wherein at least two of the different types of granular matter have densities being larger than the density of the liquid. The system comprises a stratification machine with a stratification or sorting chamber for holding the combination of liquid and granular matter, which stratification or sorting chamber has one or more side walls. The stratification machine also holds a movable plate arranged within the stratification or sorting chamber, where the moveable plate has sieve openings smaller than the minimum grain size of the granular matter to be treated to thereby maintain the granular matter above or on top of the movable plate. The stratification machine further holds a drive system for moving the movable plate in vertical upwards and downwards movements within the stratification or sorting chamber to (Continued)

thereby exercise or treat the granular matter within the liquid. There is also provided a method for treating the combination of a liquid and granular matter. The granular matter may include or consist of polymer granular matter.

16 Claims, 11 Drawing Sheets

(58) Field of Classification Search
USPC .......................................................... 209/269
See application file for complete search history.

(56) References Cited

FOREIGN PATENT DOCUMENTS

| | | | | |
|---|---|---|---|---|
| CN | 114919895 A | * | 4/2022 | |
| CN | 114919895 A | * | 8/2022 | |
| CN | 115501664 A | * | 12/2022 | |
| WO | 2008061320 A1 | | 5/2008 | |
| WO | WO-2020119873 A1 | * | 6/2020 | ............... B03B 5/02 |

* cited by examiner

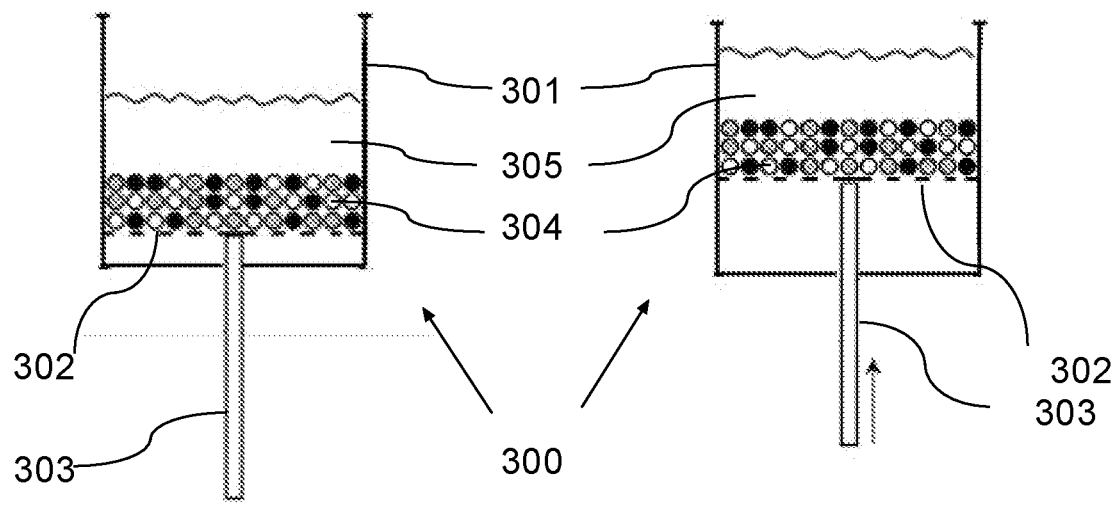
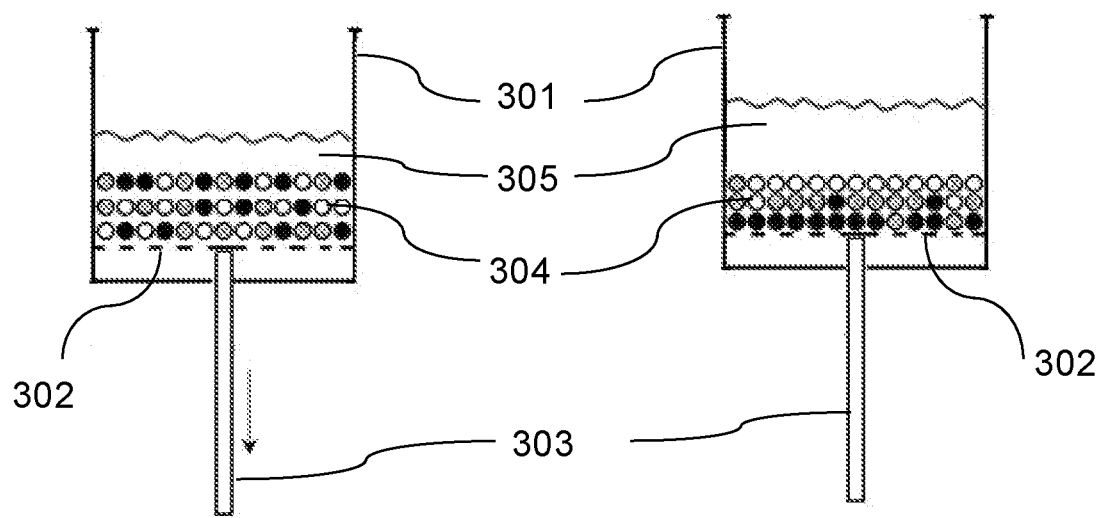
Fig. 3a  Fig. 3b
Fig. 3c  Fig. 3d

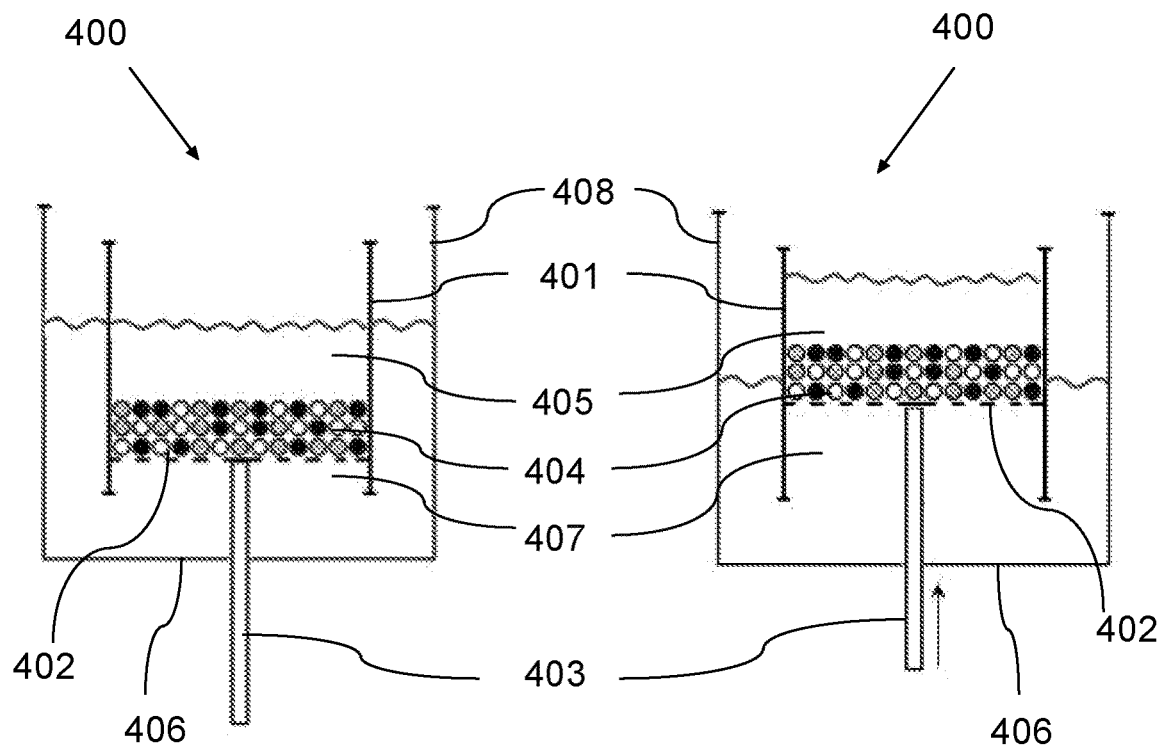
Fig. 4a
Fig. 4b
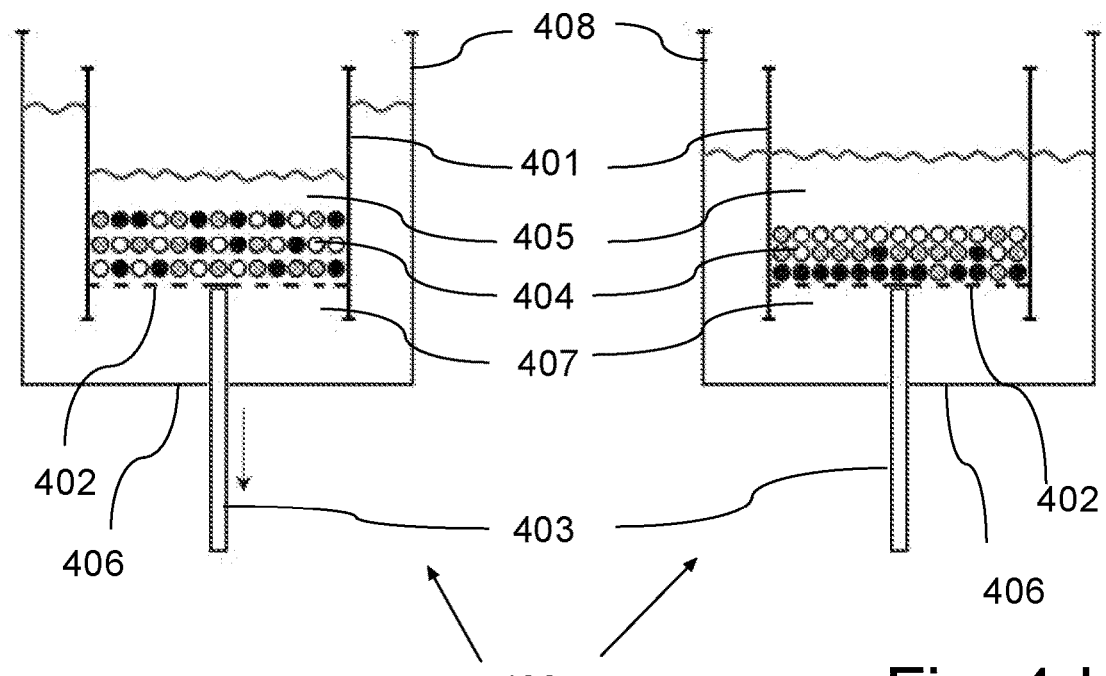
Fig. 4c
Fig. 4d

SYSTEM AND METHOD FOR TREATING A COMBINATION OF A LIQUID AND GRANULAR MATTER

CROSS-REFERENCE TO RELATED PATENT APPLICATIONS

This application is a U.S. National Stage Application under 35 U.S.C. § 371 of International Patent Application No. PCT/DK2019/050386, filed Dec. 12, 2019, which claims the benefit of priority of Denmark Patent Application Nos. PA201900998 filed Aug. 23, 2019, and PA201870817 filed Dec. 14, 2018, all of which are incorporated by reference in their entireties. The International Application was published on Jun. 18, 2020, as International Publication No. WO 2020/119873 A1.

TECHNICAL FIELD

The disclosure relates to a system and a method for treating a combination of a liquid and granular matter, which granular matter comprises two or more types of granular matter with different densities, with at least two of said different types of granular matter have densities being larger than the density of the liquid. The types of granular matter to be treated may be types of polymer granular matter, but other types of mixed granular matter may also be treated in accordance with the disclosed method and system.

BACKGROUND

Plastic pollution is a widely discussed issue on a global basis as it may have a severe impact on the environment. Every year millions of tonnes of plastic ends up in the environment with a potential risk of harm to both people and the natural environment. Furthermore, the production of virgin plastics has a considerable carbon impact as the raw materials used in the production are often based on fossil fuels. Recycling of plastic is typically limited to products of a single type of plastic as melting and reusing products of several different types of plastic tend to create polymer blends that exhibit structural weaknesses. As a result, plastics, and the production thereof, impose significant strains on the resources and environment of the planet. For this and other reasons there is a need for improved sorting of plastics and recycling thereof.

Methods for sorting plastics, in particular granular matter, typically utilise the sink and float technique, where the granular matter is submerged in a medium, typically a liquid, having a density higher or lower than the matter to be separated, such that the matter will float to the top or sink to the bottom of the medium. The matter may then be removed from the medium. Depending on the matter to be sorted, the density of the medium may be such that two clear fractions of the matter are separated, with one sinking to the bottom of the medium and one floating to the top, such that both fractions may be removed. Similarly, in the mining industry, a process called jigging is used where the granular matter is placed on a grid or sieve in a column of medium and a separate device agitates the column of medium to aid the separation of the different fractions of the matter, causing the granular matter to move in the liquid and the denser matter to settle on the grid or sieve. When a sieve or grid is used the heavier matter may sift through the sieve or grid such that it settles below it and the lighter matter will settle above the sieve.

These methods may have the issue that the separation of the granular matter achieved is not satisfactory. Furthermore, it may be difficult to separate a mixture of granular material consisting of several different fractions of material with different densities.

Thus, there is a need for an improved system and method for treating a mixture of granular matter consisting of several different fractions of material with different densities to thereby obtain an improved separation of the granular matter.

SUMMARY

It is an object of the invention to provide an improved system and method for treating a mixture of granular matter comprising fractions of material with different densities to thereby obtain an improved separation of the granular matter.

This object is achieved in accordance with a first aspect by providing a system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:

a stratification or sorting chamber for holding the combination of liquid and granular matter, said stratification or sorting chamber having one or more side walls;

a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and a drive system for moving the movable plate in vertical upwards and downwards movements within the stratification or sorting chamber to thereby exercise or treat the granular matter within the liquid.

The types of granular matter being treated may be types of polymer granular matter, but other types of mixed granular matter may also be treated.

At least two types of the granular matter to be treated should have a density being larger than the liquid, whereby the granular matter can sink within the liquid.

By moving the movable plate in vertical upwards and downwards movements within the liquid in the stratification or sorting chamber, the granular matter is pushed upwards within the liquid during upwards movements and allowed to settle during and after downwards movement, whereby a stratification of the granular matter within the liquid may be obtained based on the difference in densities.

In a possible implementation form of the first aspect, the movable plate is positioned at a distance above a bottom part below the side wall(s) of the stratification or sorting chamber thereby defining a lower chamber part between an upper surface of said bottom part and a lower surface of the movable plate, said lower chamber part having a change in volume by upwards or downwards movement of the movable plate within the stratification or sorting chamber. The stratification machine may further comprise a fluid compensation system being fluidly connected to the lower chamber part and configured for delivering and receiving a liquid to and from said lower chamber part, whereby liquid can be supplied to the lower chamber part when the volume of the lower chamber part is increased and liquid can be received from the lower chamber part when the volume of the lower chamber part is decreased.

Thus, in a possible implementation form of the first aspect, there is provided a system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:
- a stratification or sorting chamber for holding the combination of liquid and granular matter, said stratification or sorting chamber having one or more side walls;
- a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate, said movable plate being positioned at a distance above a bottom part below the side wall(s) of the stratification or sorting chamber thereby defining a lower chamber part between an upper surface of said bottom part and a lower surface of the movable plate;
- a drive system for moving the movable plate in vertical upwards and downwards movements within the stratification or sorting chamber thereby changing the volume of the lower chamber part; and
- a fluid compensation system being fluidly connected to the lower chamber part and configured for delivering and receiving a liquid to and from said lower chamber part, whereby liquid can be supplied to the lower chamber part when the volume of the lower chamber part is increased and liquid can be received from the lower chamber part when the volume of the lower chamber part is decreased. The granular matter being treated may be or include polymer granular matter.

In a possible implementation form of the first aspect, an upper or top part of the stratification or sorting chamber is configured for free entrance of air. In a preferred embodiment the stratification or sorting chamber is open at the top.

By having the sieve openings in the movable plate, the movable plate can move up and down within the liquid when exercising the granular matter. However, part of the granular matter may lay on top of the movable plate and prevent a liquid flow through part of the sieve openings, whereby a vacuum or under pressure can occur in the lower chamber part when the movable plate is moved upwards. In order to compensate for such lowering in pressure, liquid is supplied from the fluid compensation system to stabilize the pressure within the lower chamber part. When the movable plate is moved downwards, an over pressure may occur in the lower chamber part, and liquid is supplied from the lower chamber part to the fluid compensation system.

In a possible implementation form of the first aspect, the drive system is configured for moving the movable plate in accordance with a stratification or sorting motion comprising a series of vertical upstrokes and vertical downstrokes through the liquid in the stratification or sorting chamber.

In a possible implementation form of the first aspect, the drive system is configured for moving the movable plate in accordance with a predetermined sorting motion within the stratification or sorting chamber.

In a possible implementation form of the first aspect, the drive system is configured for pausing the movements of the moveable plate between completing a downwards movement or downstroke and initiating an upwards movement or upstroke of the movable plate.

In a possible implementation form of the first aspect, the drive system is configured for holding a pause of at least 0.5 seconds, such as at least 1 second, or such as at least 1.5 seconds between completing a downwards movement or downstroke and initiating an upwards movement or upstroke of the movable plate.

In a possible implementation form of the first aspect, the drive system is configurable for adjusting the length of the pause between completing a downwards movement or downstroke and initiating an upwards movement or upstroke of the movable plate.

In a possible implementation form of the first aspect, the drive system is configurable for adjusting the acceleration of an upwards movement of the movable plate, and/or the drive system is configurable for adjusting the velocity of an upwards movement of the movable plate.

In a possible implementation form of the first aspect, the drive system is configurable for adjusting the acceleration of a downwards movement of the movable plate, and/or the drive system is configurable for adjusting the velocity of a downwards movement of the movable plate.

In a possible implementation form of the first aspect, the drive system is configurable for adjusting the amplitude of the movements of the movable plate according to the ratio of volume of granular matter to be sorted to the volume of the liquid in the stratification or sorting chamber.

In a possible implementation form of the first aspect, the drive system is configured for controlling the amplitude of the movements of the movable plate between a lower or resting position and a first maximum upper position.

In a possible implementation form of the first aspect, the first maximum upper position is determined based on the amount of liquid and granular matter within the stratification chamber, to thereby ensure that the granular matter is all covered by the liquid when the movable plate reaches the first maximum upper position.

In a possible implementation form of the first aspect, the drive system is re-configurable for controlling the amplitude of the movements of the movable plate.

In a possible implementation form of the first aspect, the at least two types of granular matter, which have a density being larger than the density of the liquid, have a grain size within a defined range of ratios between the smallest and largest grain sizes In a possible implementation form of the first aspect, the defined range of ratios is from a ratio of 1:1 to a ratio of 1:100 between the smallest and largest grain sizes.

In a possible implementation form of the first aspect, the drive system is configurable for lifting the movable plate upwards to a discharging height, for which height at least part of or all of the granular matter is lifted above the surface of the liquid within the stratification chamber.

In a possible implementation form of the first aspect, the system further comprises a discharge system for discharging the granular matter from the liquid within the stratification chamber.

In a possible implementation form of the first aspect, the discharge system is configured for discharging an uppermost layer of the granular matter being lifted above the surface of the liquid within the stratification chamber.

In a possible implementation form of the first aspect, the discharge system is configured for repeatedly discharging the uppermost layer of the granular matter.

In a possible implementation form of the first aspect, the system further comprises a density identification system for identifying granular matter of different densities.

In a possible implementation form of the first aspect, the density identification system is configured for identifying changes in density between fractions of granular matter being output from the discharging system.

According to a second aspect, there is provided a method for treating a combination of a liquid and granular matter, said granular matter comprising two or more types of granular matter with different densities, wherein the method comprises:
  providing a stratification or sorting chamber having one or more side walls;
  providing two or more types of granular matter with different densities and a liquid to be used for the combination, wherein at least two of said two or more types of granular matter have densities being larger than the density of the liquid;
  combining the provided granular matter with the provided liquid in the stratification or sorting chamber;
  providing a series of upwards and downwards movements of the granular matter within the liquid, wherein for at least part of said downwards movements there is a resting period from the end of the downwards movement for settlement of the granular matter within the liquid before initiating a new upwards movement of the granular matter within the liquid. The types of granular matter being treated may be types of polymer granular matter, but other types of mixed granular matter may also be treated.

In a possible implementation form of the second aspect, the series of upwards and downwards movements of the granular matter within the liquid is in accordance with a predetermined sorting motion within the stratification or sorting chamber.

In a possible implementation form of the second aspect, the resting period has a minimum length determined according to the ratio of the density of the liquid in the stratification chamber and the density of the granular matter having the highest density.

In a possible implementation form of the second aspect, the resting period before initiating a new upwards movement of the granular matter within the liquid is at least 0.5 seconds, such as at least 1 second, or such as at least 1.5 seconds.

In a possible implementation form of the second aspect, the series of upwards and downwards movements of the granular matter within the liquid may be divided in a least a first and a second series of upwards and downwards movements, and for at least part of the downwards movements for both the first and second series of said movements there is a resting period from the end of the downwards movement for settlement of the granular matter within the liquid before initiating a new upwards movement of the granular matter within the liquid.

In a possible implementation form of the second aspect, the resting period differs from the first series of movements to the second series of movement.

In a possible implementation form of the second aspect, the first series of movements have an amplitude of the upwards movements being different to the amplitude of the upwards movements of the second series of movements.

In a possible implementation form of the second aspect, the first series of movements are performed before the second series of movements, and the resting period of the first series of movements is longer than the resting period of the second series of movements.

In a possible implementation form of the second aspect, the first series of movements are performed before the second series of movements, and the amplitude of the upwards movements of the first series of movements is larger than the amplitude of the upwards movements of the second series of movements.

In a possible implementation form of the second aspect, the first series of movements are performed before the second series of movements, and the total duration of treating the combination of the liquid and granular matter by the first series of movements is shorter than or equal to the total duration of treating the combination of the liquid and granular matter by the second series of movements.

In a possible implementation form of the second aspect, the provided granular matter is larger than or equal to a minimum grain size.

In a possible implementation form of the second aspect, the provided at least two types of granular matter, which have a density being larger than the density of the liquid, have a grain size within a defined range of ratios between the smallest and largest grain sizes In a possible implementation form of the second aspect, a movable plate is provided and arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, said moveable plate being configured to maintain the granular matter above or on top of the movable plate. The method according to the second aspect may then further comprise:
  moving the movable plate in vertical upwards and downwards movements within the stratification or sorting chamber to thereby provide said series of upwards and downwards movements of the granular matter within the liquid with.

In a possible implementation form of the second aspect, the moveable plate is a plate sieve with sieve openings smaller than the minimum grain size of the granular matter to be treated, whereby the movable plate can move up and down within the liquid while maintaining the granular matter above or on top of the movable plate.

In a possible implementation form of the second aspect, the movable plate is positioned at a distance above a bottom part below the side wall(s) of the stratification or sorting chamber thereby defining a lower chamber part between an upper surface of said bottom part and a lower surface of the movable plate, said lower chamber part having a change in volume by upwards or downwards movement of the movable plate within the stratification chamber; and
  a fluid compensation system is provided, which fluid compensation system is fluidly connected to the lower chamber part and configured for delivering and receiving a liquid to and from said lower chamber part, whereby liquid is supplied to the lower chamber part when the volume of the lower chamber part is increased by the upwards movements of the movable plate and liquid is received from the lower chamber part when the volume of the lower chamber part is decreased by the downwards movements of the movable plate.

In a possible implementation form of the second aspect, the movements of the movable plate is controlled to be between a lower or resting position and a predetermined first maximum upper position; and the first maximum upper position is determined based on the amount of liquid and granular matter within the stratification chamber, to thereby ensure that the granular matter is all covered by the liquid when the movable plate reaches the first maximum upper position.

In a possible implementation form of the second aspect, the distance between the lower position and the first maximum upper position is determined according to the ratio of volume of granular matter to the volume of the liquid in the stratification chamber.

In a possible implementation form of the second aspect, the defined range of ratios is from a ratio of 1:1 to a ratio of 1:100 between the smallest and largest grain sizes.

In a possible implementation form of the second aspect, the method further comprises a discharging process, wherein at least part of or all of the treated granular matter are separated from the liquid.

In a possible implementation form of the second aspect, the granular matter is lifted upwards to a height, for which height at least part of or all of the granular matter is lifted above the surface of the liquid within the stratification chamber.

In a possible implementation form of the second aspect, then for separating the granular matter from the liquid, the movable plate is moved upwards to a discharging height, for which height all of the granular matter is lifted above the surface of the liquid within the stratification chamber.

In a possible implementation form of the second aspect, the discharging process comprises removing from the stratification chamber an uppermost layer of the granular matter being lifted above the surface of the liquid.

In a possible implementation form of the second aspect, the discharging process comprises repeatedly removing an uppermost layer of the granular matter from the stratification chamber.

In a possible implementation form of the second aspect, the method further comprises a density identification process for identifying granular matter of different densities.

In a possible implementation form of the second aspect, the density process comprises identifying changes in density between fractions of granular matter being removed from the stratification chamber during said discharging process.

In a possible implementation form of the second aspect, a surface-active agent is added to or is part of the liquid being provided to be used for the combination of a liquid and granular matter.

It should be understood that the possible implementation forms according to the methods of the second aspect may be performed by use of a system selected from one or more of the implementation forms of the first aspect.

According to a third aspect there is provided a method for treating or sorting granular matter comprising two or more types of matter with different densities, comprising the steps of:

providing a container comprising one or more side walls defining a stratification or sorting chamber, combining the granular matter to be sorted with a liquid in said stratification or sorting chamber;

providing within said stratification or sorting chamber a movable plate which substantially seals against the one or more side walls of the stratification or sorting chamber and which has openings smaller than the smallest grain size of the granular matter to be sorted, and moving the movable plate in accordance with a predetermined sorting motion within said stratification or sorting chamber. The granular matter being treated or sorted may be or include polymer granular matter.

It should be understood that the possible implementation forms according to the methods of the third aspect may be performed by use of a system selected from one or more of the implementation forms of the first aspect.

It is within an embodiment of the third aspect that the matter to be treated or sorted is granulated into grains of sizes within a defined range of ratios between the smallest and largest grain sizes before the step of combining the granular matter to be sorted with a liquid in said stratification or sorting chamber.

The term "granular matter" may be understood as solid material that is in the form of discrete grains, particles, granules, flakes, pellets or the like. The lower size limit of the grains in the granular material may be 1 µm.

The term "types of matter" may be understood as different types of material of matter. This may be different types of polymer such as, but not limited to, ABS, PC, POM, PET, PVC as well as different types and/or combinations thereof.

The term "different densities" may be understood as densities which are different by at least 0.0001, preferably 0.001, more preferably 0.01 g/cm$^3$.

The term "defined range of ratios between the smallest and the largest grain sizes" may be understood as the range of ratios between the smallest and the largest grain sizes that grains of the granular matter exhibit i.e. defining the difference in size between the smallest and the largest grains of the granular matter to be sorted.

Granulating of the matter to be sorted may be achieved by granulating the matter to be sorted in a granulator such as a polymer granulator.

At least 40%, 50%, 60%, 70%, 80%, 90% or 95% of the granulated matter to be sorted may be within the defined range of ratios between the smallest and largest grain sizes.

Granulating the matter to be sorted into grains of sizes within a defined range of ratios between the smallest and largest grain sizes may have the effect of improving the stratification of the granular matter to be sorted as the influence of size difference of the grains of the granular matter to be sorted is reduced. Being able to select the size ratio between smallest and largest grain sizes for different materials may have the effect of allowing the stratification process to be optimised to ensure optimum efficiency.

The granular matter to be sorted may be granulated into grain sizes dependent on the ratio of the volume of the granular matter to be sorted to the volume of liquid in the stratification or sorting chamber. This may have the effect of improving the settling of the grains of the granular matter to be sorted in respective layers in the liquid according to the density of the grains. Additionally or alternatively, the matter to be sorted may washed before and/or after the granulation.

The term "grain" may be also be denoted as "particle". The term "grain size" may also be denoted as "particle size" and may be understood as the diameter of an individual grain or particle.

The term "stratification" may be understood as the separation of the grains of the granular matter of different densities into layers according to their respective densities in the sorting chamber. The term "stratification process" may be understood as the process of stratifying the grains of the granular matter of different densities into layers according to their respective densities i.e. including the process of executing the predetermined sorting motion.

Additionally or alternatively, the polymer matter to be sorted or the granulated polymer matter to be sorted may be pelletized. The term "pelletize" may be understood as the process of compressing or moulding a material into the shape of a pellet. The term "pellet" may be understood as a small, rounded, compressed mass of a matter. Additionally or alternatively, the matter to be sorted may be pelletized such that the grains of the matter to be sorted are of substantially the same shape. This may have the effect of further improving the stratification process as the influence of the shape of the grains of the matter to be sorted is reduced.

Additionally or alternatively, a substance may be added to the liquid in the stratification or sorting chamber to reduce the surface tension in the liquid. The lowered surface tension may have the effect of improving the stratification process of the granular matter to be sorted.

Additionally or alternatively, the liquid in the stratification or sorting sorting chamber may have a density that is chosen based on the densities of the different types of matter to be sorted. The density of the liquid may be chosen such that it is the mean of the different densities of the matter to be sorted. Additionally or alternatively, the density of the liquid may be manipulated by additives and/or magnetism. Additionally or alternatively, liquids of different densities may be used. Additionally or alternatively, liquids of different viscosities may be used.

The one or more side walls of the container may define a stratification or sorting chamber of cylindrical, rectangular, square, circular or polygonal shape.

Additionally, or alternatively, the stratification or sorting chamber may be in liquid communication with a second chamber.

Providing within said stratification or sorting chamber a movable plate which substantially seals against the one or more side walls of the stratification or sorting chamber and which has openings smaller than the smallest grain size of the granular matter to be sorted may have the effect that the granular matter to be sorted is kept above the moveable plate.

This may have the effect that the granular matter to be sorted is more effectively moved as substantially all of the granular matter may be moved in the same motion of the moveable plate with none of the granular matter bypassing the moveable plate. This may lead to a more efficient stratification of the granular matter to be sorted.

The movable plate may be moved in accordance with a predetermined sorting motion within the stratification or sorting chamber. Moving the moveable plate according to a predetermined sorting motion has the effect of improving the stratification of the granular matter to be sorted.

The parameters of the predetermined sorting motion may be adjusted based on the types of matter to be sorted. The parameters of the predetermined sorting motion may be adjusted based on the ratio of volume of granular matter to be sorted to the volume of liquid in the stratification or sorting chamber. This may have the effect of allowing the stratification process to be optimised for optimum efficiency based on the types of matter to be sorted and/or ratio of volume of granular matter to be sorted to the volume of liquid in the sorting chamber. The parameters of the predetermined sorting motion may also be adjusted during the sorting process. For example, towards the end of a sorting cycle. The duration of the stratification process may be adjusted according to the quantity of upstrokes and downstrokes. The duration of the stratification process may be adjusted according to cycle time, i.e. the time from initiating the stratification till the time of completion of the stratification process.

When the granular matter to be sorted is combined with a liquid in the stratification or sorting chamber, the granular matter to be sorted or the liquid may be provided in the stratification or sorting chamber first. The liquid and granular matter to be sorted may also be provided substantially at the same time.

In an embodiment of the present invention, said predetermined sorting motion comprises a series of vertical upstrokes and vertical downstrokes through the liquid in the stratification or sorting chamber. The amplitude of the upstrokes and downstrokes may be different. The amplitude of the upstrokes and/or downstrokes may be adjusted over time. The velocity of the upstrokes and/or downstrokes may be different. The velocity of the upstrokes and/or downstrokes may be adjusted over time. The acceleration of the upstrokes and/or downstrokes may be different. The acceleration of the upstrokes and/or downstrokes may be adjusted over time. Similarly, successive upstrokes may be different from each other. Successive downstrokes may be different from each other. This may provide an improved stratification process as the motion parameters of the upstrokes and downstrokes may be chosen for optimum efficiency for given types of matter or state of stratification.

The term "the upstrokes and downstrokes may be different" may be understood as the upstroke may exhibit one type of vertical motion, where the downstroke exhibits a different type of vertical motion i.e. the motion parameters such as the amplitude, velocity, acceleration and/or pauses at the end or beginning of a stroke, of the upstroke and of the downstroke may be different. The term "adjusted over time" may be understood as changed over time e.g. changed during the sorting process as time progresses.

In a development of the latter embodiment, an amplitude of the upstroke and downstroke is adjustable according to the ratio of volume of granular matter to be sorted to the volume of the liquid in the stratification or sorting chamber. This may have the effect of improving the stratification process of the granular matter to be sorted as different amplitudes of the upstrokes and downstrokes may influence the efficiency of the stratification, particularly in relation to the volume of the granular matter to be sorted, more specifically the ratio of the volume of granular matter to be sorted to the volume of liquid in the sorting chamber. Experimental results have pointed at that the most effective stroke amplitude, in terms of cycle time and settling of the particles, seems to be dependent on the volume of the granular material to the volume of the fluid in the stratification or sorting chamber. The higher the volume of the granular matter to be sorted, the higher the solid volume fraction, which may have the effect of decreasing the mean settling velocity of the grains (hindered settling) and thus reducing the stratification efficiency.

Additionally or alternatively, an acceleration of the downstroke is adjustable according to the ratio of volume of granular matter to be sorted to the volume of the liquid in the stratification or sorting chamber. This may have the effect of further improving the efficiency of the stratification process as the acceleration of the downstroke has been found to have a significant impact on the stratification process. Being able to adjust the acceleration of the downstroke according to the ratio of volume of the granular matter to be sorted to the volume of liquid in the stratification or sorting chamber may have the effect of allowing the stratification process to be optimised for optimum efficiency for a given load scenario. Similarly, an acceleration of the upstroke is adjustable.

Similarly, the velocity of a downstroke may be adjustable according to the ratio of volume of granular matter to be sorted to the volume of the liquid in the stratification or sorting chamber. The velocity of an upstroke may be adjustable according to the ratio of volume of granular matter to be sorted to the volume of the liquid in the stratification or sorting chamber. This may have the effect of allowing the stratification process to be further optimised and so improving the efficiency of the sorting method.

The term "load" may be understood as the volume of granular matter to be sorted and the volume of liquid in the stratification or sorting chamber.

Additionally or alternatively, there is a pause between completing a downwards movement or a downstroke and initiating an upwards movement or an upstroke. This may have the effect of improving the efficiency of the stratification process. A pause between completing a downstroke and initiating an upstroke has been linked to improving the settling of the grains of the granular matter to be sorted into respective layers in the liquid according to the density of the grains, and thus improving the stratification process. Experimental results point to a pause between the downstroke and the upstroke being highly important for efficient stratification of the granular matter. In a development of the latter, the pause between completing a downstroke and initiating an upstroke is at least 0.5 second. This may improve the stratification process as the pause provides time for grains in the liquid to settle according to their respective densities.

Additionally or alternatively, there is a pause between completing an upwards movement or an upstroke and initiating a downwards movement or a downstroke. This may have the effect of improving the efficiency of the stratification process as settling of the grains of the granular matter to be sorted in the liquid according to the density of the grains may be improved.

The pause between the completing a downstroke and initiating an upstroke may be at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140 or 150 seconds. Similarly, the pause between the completing an upstroke and initiating a downstroke may be at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140 or 150 seconds.

Additionally or alternatively, the defined range of a ratios is from a ratio of 1:1 to a ratio of 1:100 between the smallest and largest grain sizes. This may have the effect of ensuring an optimum stratification efficiency as the effect of the size difference of grains on the stratification process is kept within limits. The defined range of a ratios may be from a ratio of 1:1 to a ratio of 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:30, 1:40, 1:50, 1:60, 1:70, 1:80, 1:90 or 1:100 between the smallest and largest grain sizes.

Additionally or alternatively, the sorted granular matter fractions are discharged layer by layer from top to bottom of the stratification or sorting chamber. This may have the effect of simplifying the discharge process as the layers may be discharged through the same opening and no separate discharge opening has to be provided. It may have the further effect of allowing a discharge order of the discharged layers to be maintained. This in turn may allow a more efficient handling of the discharged layers in subsequent processes such as for example washing, drying, packaging, storing and/or transportation.

The term "fraction" may be understood as a group of grains of the granular material which have substantially the same density.

The layer by layer discharge of the sorted granular matter achieved using an extraction device. The extraction device may be a vacuum device. The vacuum device may discharge a layer from the stratification or sorting chamber by sucking the layer up and exhausting it elsewhere. The extraction device may be a scraping device. The scraping device may discharge a layer of sorted granular matter from the stratification or sorting chamber by scraping the layer off and onto or into a new location.

Additionally or alternatively, the transition between fractions of the sorted granular matter having different densities is identified during or after discharge of the sorted granular matter from the stratification or sorting chamber. The identification of the transition may be achieved optically. The identification of the transition may be achieved by use of mid-infrared (MIR) scanning. The term "transition" may be understood as the point between subsequently discharged sorted granular matter, where one fraction of sorted granular matter ends and the next fraction of sorted granular matter begins. Additionally or alternatively, transition zones or layers where matter may not be satisfactorily sorted may be taken aside and re-sorted. Additionally or alternatively, the order in which the layers of sorted granular matter fractions are discharged from the stratification or sorting chamber is maintained in at least one subsequent process. This may have the effect of improving the efficiency of subsequent processes such as storing and packaging the discharged fractions of granular matter as highlighted above. Additionally or alternatively, the layers of sorted granular matter fractions are packaged according to the order of discharge from the stratification or sorting chamber.

In a fourth aspect an apparatus for use in the method according to the third aspect is provided, where the apparatus comprises:
  a container comprising one or more side walls defining a stratification or sorting chamber;
  a movable plate arranged within said stratification or sorting chamber, where the moveable plate substantially seals against the one or more side walls of the stratification or sorting chamber and which has openings smaller than the smallest grain size of the granular matter to be sorted.

The one or more side walls may define a stratification or sorting chamber of cylindrical, circular, rectangular, square or another polygonal shape. The stratification or sorting chamber may further comprise a base. The base may be located below the movable plate and connected with the one or more side walls. The base may be plate shaped. The base may comprise an opening.

The stratification or sorting chamber may have a volume of at least 10, 20, 30, 40, 50, 60, 70, 80, 90, 100, 110, 120, 130, 140, 150, 200, 250, 300, 400, 500, 600, 700, 800, 900 or 1000 litres.

The moveable plate may seal against the one or more side walls of the stratification or sorting chamber by means of at least one lip seal.

The apparatus may further comprise a drive unit for driving the moveable plate. The drive unit may be in the form of a linear drive or positioning drive. The linear drive and/or positioning drive may comprise an electric motor and/or linear guide. The drive unit may be connected to the moveable plate via a shaft.

The apparatus may further comprise a chamber seal. The chamber seal may be cylindrical. The chamber seal may comprise a top housing body and a bottom housing body. The top housing body and the bottom housing body may be detachably interconnected by bolts, screws, adhesives, screw thread and like interconnecting means.

To this end, the chamber seal may comprise one or more threaded holes. The chamber seal may comprise one or more through holes. The chamber seal may comprise one or more sealing elements. The one or more sealing elements may be in the form of wiper seals, rod seals, o-ring seals and the like.

A "wiper seal" may be understood as a sealing element that maintains sealing contact with the shaft when the shaft is stationary (static, no reciprocating motion of shaft) and moving (dynamic, reciprocating motion of shaft). A "rod seal" may be understood as a sealing element that maintains sealing contact in sliding motion between the chamber seal and the shaft. The rod seal may further comprise a lubricating film. An "o-ring seal" may be understood as a ring-shaped mechanical sealing element with a round cross-section.

The sealing elements may be housed in the chamber seal. The one or more sealing elements may be housed in the top housing body. The one or more sealing elements may be housed in the bottom housing body. The top housing body may comprise one or more sealing elements and the bottom housing body may comprise one or more sealing elements. The one or more sealing elements may be substantially identical. The one or more sealing elements may be different from each other. The one or more sealing elements may be made partly from natural or synthetic rubber such as BR, NBR, HNBR, EPDM, SiR or the like. The one or more sealing elements may be made entirely from natural or synthetic rubber such as BR, NBR, HNBR, EPDM, SiR or the like. The sealing elements may be made partly from metal such as steel, stainless steel, aluminium, brass, copper or the like. The sealing elements may be made entirely from metal such as steel, stainless steel, aluminium, brass, copper or the like. The one or more sealing elements may be made partly from polymers such as PTFE, PE, TPU, TPE, LDPE, HDPE, LLDPE, ULDPE and the like. The one or more sealing elements may be made entirely from polymers such as PTFE, PE, TPU, TPE, LDPE, HDPE, LLDPE, ULDPE and the like. The chamber seal may comprise one or more flanges. The chamber seal may further comprise one or more guide elements for guiding the shaft. The one or more guide elements may be in the form of guide rings, linear guides such as linear ball bearings, friction guides and the like.

A "guide ring" may be understood as a ring-shaped guiding element which guides a shaft. The guide ring may prevent shaft to chamber seal contact.

The chamber seal may comprise one or more o-rings for sealing between the chamber seal and the stratification or sorting chamber. Additionally or alternatively, the chamber seal may comprise one or more wiper seals for sealing between the chamber seal and the shaft. Additionally or alternatively, the chamber seal may comprise a rod seal for sealing between the chamber seal and the shaft. Additionally or alternatively, the chamber seal may comprise one or more guide elements for guiding the shaft. The one or more guide elements may be in the form of a rod guide ring and a pair of linear guides in the form of linear ball bearings. Additionally or alternatively, the chamber seal may comprise retaining means for retaining the sealing elements and/or guide elements in the chamber seal. The chamber seal may be located inside the stratification or sorting chamber. The chamber seal may be located outside the stratification or sorting chamber. The chamber seal may be located partly inside and/or outside the stratification or sorting chamber. The top housing body of the chamber seal may seal against the top of the base of the stratification or sorting chamber. The bottom housing body of the chamber seal may seal against the bottom of the base of the stratification or sorting chamber. The top housing body may be located within the stratification or sorting chamber. The bottom housing body may be located outside the stratification or sorting chamber.

In an embodiment according, the chamber seal for sealing between the shaft and the stratification or sorting chamber comprises one or more wiper seals, one or more guide rings, one or more rod seals and one or more linear guides.

The system or apparatus may further comprise a control unit for controlling and/or adjusting the motion parameters of the moveable plate. The control unit may control and/or adjust both the predetermined sorting motion of the moveable plate and the motion of the moveable plate during the sorting process.

The foregoing and other objects are achieved by the features of the independent claims. Further implementation forms are apparent from the dependent claims, the description and the figures. These and other aspects of the invention will be apparent from the embodiments described below.

BRIEF DESCRIPTION OF THE DRAWINGS

In the following detailed portion of the present disclosure, the invention will be explained in more detail with reference to the example embodiments shown in the drawings, in which:

FIGS. 3a-3d are schematic drawings illustrating steps of treating a combination of a liquid and a granular matter by use of a first type of a stratification or sorting system according to an example embodiment;

FIGS. 4a-4d are schematic drawings illustrating steps of treating a combination of a liquid and a granular matter by use of a second type of a stratification or sorting system according to an example embodiment;

DETAILED DESCRIPTION

The granular matter to be treated or sorted may originate from discarded products or matter from industrial applications. Typically, the matter to be treated or sorted derives from waste from industrial production and comprises several different types of matter with different densities and grain sizes. In the example described here, the matter to be treated or sorted is polymer waste matter that stems from the production of polymer containing products. Polymer waste matter like this is often a combination of several different types of polymers of varying grain sizes and densities mixed together. As a result of this, the polymer waste is very rarely recycled as the melting and reusing of the mixed polymer waste often results in weak and poor-quality polymer products due to the mix of different types of polymers. Consequently, the polymer waste is usually incinerated in district heating plants or disposed of in landfill sites. However, with the system and method described herein, the polymer waste matter may be sorted and separated into the different types of polymer constituents according to their respective densities. This may be achieved by gathering the waste polymer and processing it on-site or transporting it (as shown in FIGS. 1 and 2) to a different dedicated treatment system or plant at a different location using a system and a method as described in detail below.

In an example embodiment, the polymer waste comprises two types of polymer matter with different densities. It should be noted that the method for sorting granular matter is not limited to granular matter comprising only two types of matter of different density, but may also be used for granular matter comprising more than two types of matter with different densities, such as more than 3, 4, 5 or more types of matter with different densities.

Figure 1:
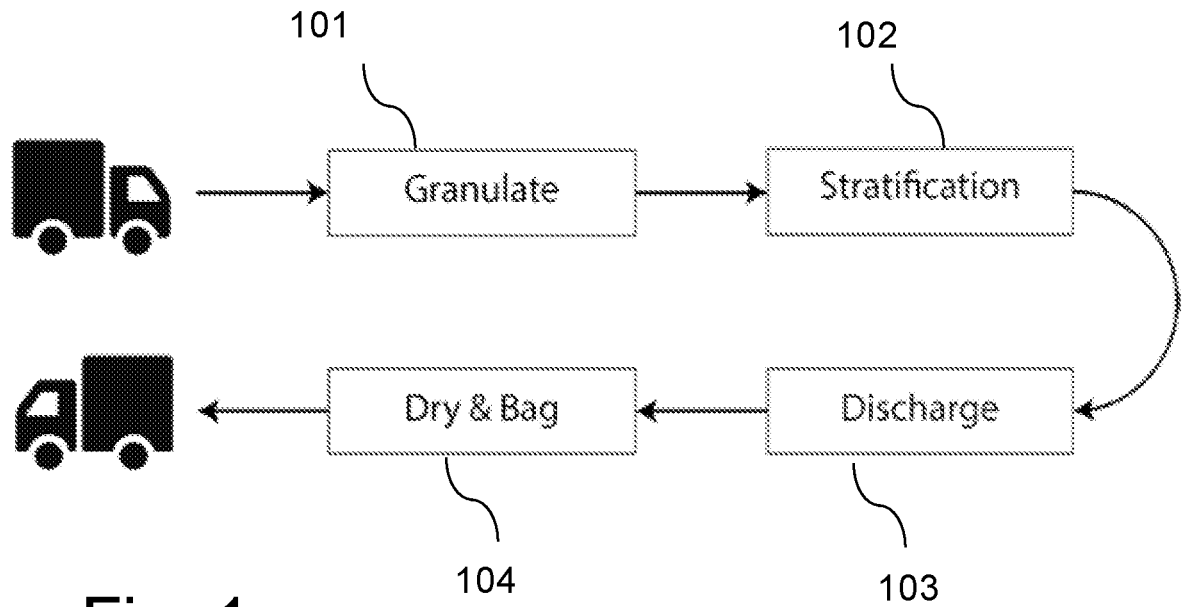
FIG. 1 shows a diagrammatic overview of a treating method according to an example embodiment.

FIG. 1 shows a diagrammatic overview of a treating method according to an example embodiment. The polymer matter to be treated may first be granulated 101 to ensure that the grain sizes of the grains of the polymer matter are within a certain range of relatively similar sized grains i.e. a defined range of ratios between the smallest and largest grain sizes. This is done to reduce the effect that size difference of grains may have on the treating process and thus to improve the efficiency of the process. In the first example described here, the granulating of the polymer matter may be achieved by feeding the polymer matter into a dry solid material granulator, where the matter is granulated and/or shredded into particles within a defined ranged of ratios between the smallest and the largest grain sizes. The granulation may also be achieved by other suitable devices such as wet or dry shredders or wet granulators. The granulated matter may then be fed into a stratification or sorting chamber 102 to be treated or sorted. When the treatment of the granulated matter is finished within the stratification chamber, the sorted granular matter may be discharged 103 from the stratification chamber, and the discharged matter may then by exposed to a drying process and filled into bags 104.

Figure 2:
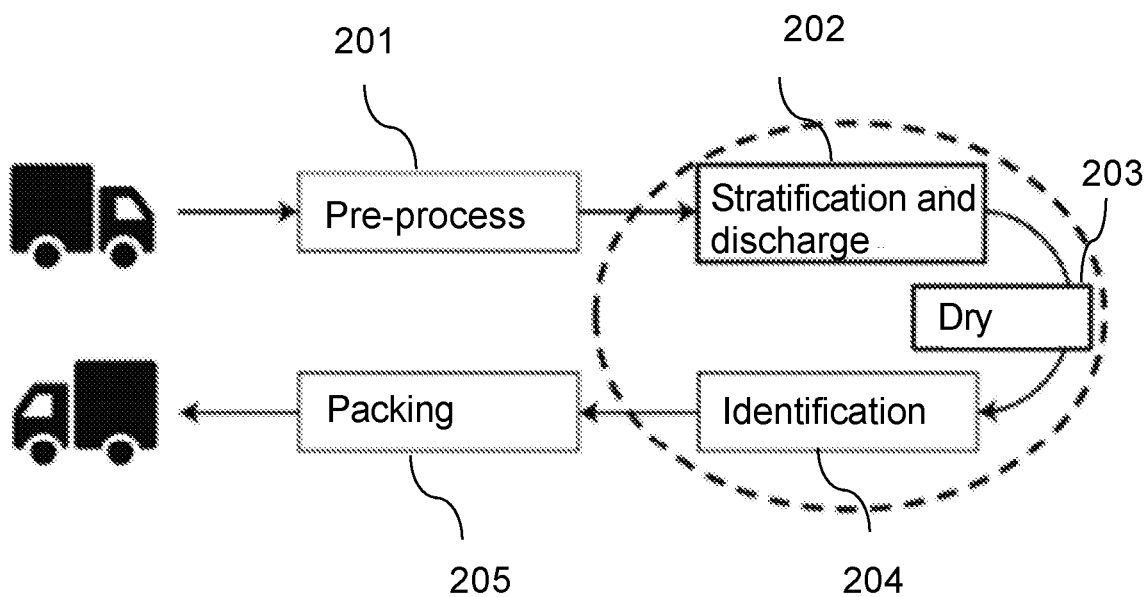
FIG. 2 shows a diagrammatic overview of a treating method according to another example embodiment.

FIG. 2 shows a diagrammatic overview of a treating method according to another example embodiment. Here, the polymer matter to be treated may be exposed to a pre-process 201, where the polymer matter is first granulated, followed by a washing process to remove any unwanted contaminants. This may be achieved by processing the waste polymer in a turbo washer. The polymer matter may additionally or alternatively be pelletized, resulting in pellets of substantially the same size and shape. In a first example described here, the polymer matter to be treated is granulated into grain sizes with a ratio of substantially 1:1 between the smallest and the largest grain sizes. The defined range of ratios may be from a ratio of 1:1 to a ratio of 1:100 between the smallest and largest grain sizes.

After the granulation and/or pelletization in the pre-process 201, the granular polymer matter to be treated is fed into the The granulated matter may then be fed into a stratification or sorting chamber 202 to be treated or sorted. When the treatment of the granulated matter is finished within the stratification chamber, the sorted granular matter may be discharged from the stratification chamber, and the discharged matter may then by exposed to a drying process 203, followed by a process of identification 204 in order to secure separation of the sorted granular matter, and finally the separated granular matter may be packed into bags 205.

FIGS. 3*a*-3*d* are schematic drawings illustrating steps of treating a combination of a liquid 305 and a granular matter 304 by use of a first type of a stratification or sorting machine 300 according to an example embodiment. The granular matter 304 is larger than or equal to a minimum grain size and comprises two or more types of granular matter 304 with different densities, wherein at least two of said two or more types of granular matter 304 have densities being larger than the density of the liquid 305. For the embodiment illustrated in FIGS. 3*a*-3*d*, there is three types of granular matter 304 with different densities, with each of these three types of granular matter having a density being larger than the density of the liquid 305. The liquid used is preferably water. Other suitable liquids, including water with additives that alter the density, may also be used.

FIGS. 3*a*-3*d* show a stratification machine 300, which comprises a stratification or sorting chamber 301 for holding the combination of liquid 305 and granular matter 304, which stratification chamber 301 has one or more side walls and a bottom. A movable plate 302 is arranged within the stratification chamber 301, where the moveable plate 302 has an outer edge or edges being closely positioned to the one or more side walls of the stratification chamber 301 with any distances between the outer edge(s) and the one or more sidewalls being smaller than the minimum grain size of the granular matter to be treated. The moveable plate 302 is a plate sieve with sieve openings smaller than the minimum grain size of the granular matter to be treated to thereby maintain the granular matter above or on top of the movable plate. A drive system 303 is provided for moving the movable plate 302 in vertical upwards and downwards movements within the stratification chamber 301 to thereby exercise or treat the granular matter 304 within the liquid 305. The drive system 303 is movably inserted into the stratification chamber 301 via a fluid tight connection at the bottom of the stratification chamber 301.

The three types of granular matter are fed into the chamber 301 together with the liquid 305. The drive system 303 is now activated and moves the plate 302 in vertical upwards and downwards movements within the stratification chamber 301 to thereby exercise or treat the granular matter 304 within the liquid 305. The amount of liquid 305 within the chamber 301 should be large enough to ensure that the granular matter 304 is fully covered by the liquid during these upwards and downwards movements of the plate 302 when exercising or treating the granular matter 304.

The granular matter 304 is treated by a series of upwards and downwards movements within the liquid 305, wherein for at least part of the downwards movements there should be a resting period from the end of the downwards movement for settlement of the granular matter 304 within the liquid 305 before initiating a new upwards movement of the granular matter 304 within the liquid 305.

FIG. 3a shows the stratification machine 300 in a start or resting position, where the moveable plate sieve 302 is in a first and lower position at a distance above a bottom of the chamber 301, with liquid being provided between the bottom and the plate sieve 302, while the granular matter 304 rests on top of the plate sieve 302 within the liquid 305 and below the upper surface of the liquid 305. In FIG. 3b the plate sieve 302 is moved upwards to a second and higher position by the drive system 303, thereby pushing the granular matter 304 upwards within the liquid 305. In FIG. 3c the plate sieve 302 is moved downwards to the first lower position by the drive system 303, preferably at a speed by so high that at least part of the granular matter 304 is floating within the liquid 305 before being settled on top of the plate sieve 302.

After a series or number of upwards and downwards movements of the plate sieve 302 with resting or settlement periods following each or at least part of the downwards movement, the granular matter 304 starts to settle on top of the plate sieve 302 in a stratified or sorted order as illustrated in FIG. 3d. The granular matter 304 having the highest density will settle at the lowest position, the granular matter 304 having the middle density will settle at a middle position, and the granular matter 304 having the lowest density will settle at the upper position.

By having the sieve openings in the movable plate 302, the movable plate 302 can move up and down within the liquid 305 when exercising the granular matter 304. However, part of the granular matter 304 may lay on top of the movable plate 302 and prevent a liquid flow through part of the sieve openings, whereby a resistance is exerted by the liquid 305 when the sieve plate 302 is moved within the chamber 301. Thus, for the stratification machine 300 of FIGS. 3a-3d the up- and downwards movement of the sieve plate 302 within the liquid 305 may be rather slow in order to allow the liquid 305 to pass through the sieve openings during the movements.

FIGS. 4a-4d are schematic drawings illustrating steps of treating a combination of a liquid 405 and a granular matter 404 by use of a second type of a stratification or sorting machine 400 according to an example embodiment. The stratification or sorting machine 400 differs from the stratification machine 300 of FIGS. 3a-3d in that the machine 400 further comprises a fluid compensation system.

Thus, FIGS. 4a-4d show a stratification machine 400 with a stratification or sorting chamber 401 with sidewalls for holding the combination of liquid 405 and granular matter 404. Also here, a movable plate 402 is arranged within the stratification chamber 401, where the moveable plate 402 has an outer edge or edges being closely positioned to the one or more side walls of the stratification chamber 401 with any distances between the outer edge(s) and the one or more sidewalls being smaller than the minimum grain size of the granular matter to be treated. The moveable plate 402 is a plate sieve with sieve openings smaller than the minimum grain size of the granular matter to be treated to thereby maintain the granular matter above or on top of the movable plate. A drive system 403 is provided for moving the movable plate 402 in vertical upwards and downwards movements within the stratification chamber 401 to thereby exercise or treat the granular matter 404 within the liquid 405.

The machine 400 also holds a fluid compensation system being at least partly provided by an outer chamber 408 having side walls and a bottom 406. The stratification chamber 401 is securely arranged within the outer chamber 408 but with a bottom part of the stratification chamber 401 being at least partly open to thereby enable a fluid connection between the lower part of the stratification chamber 401 and the outer chamber 408. The movable plate 402 is positioned at a distance above the bottom 406 of the outer chamber 408 and at a distance above a bottom or lower part of the side wall(s) of the stratification chamber 401, thereby defining a lower chamber part 407 between an upper surface of the bottom 406 of the outer chamber 408 and a lower surface of the movable plate 402. This lower chamber part 407 has a change in volume by upwards or downwards movement of the movable plate 402 within the stratification chamber 401. The drive system 403 is movably inserted into the stratification chamber 401 via a fluid tight connection at the bottom 406 of the outer chamber 408.

The arrangement of the stratification chamber 401 and the sieve plate 402 within the outer chamber 408 thus provides a fluid compensation system, whereby liquid 405 can be supplied from the outer chamber 408 to the lower chamber part 407, when the volume of the lower chamber part 407 is increased, and liquid can be received by the outer chamber 408 from the lower chamber part 407 when the volume of the lower chamber 407 part is decreased.

When the stratification machine 400 is in use for treating a combination of liquid 405 and granular matter 404, the sieve plate 402 can be moved upwards and downwards at a higher speed when compared to the stratification machine 300 of FIGS. 3a-3d due the provided fluid compensation system, whereby it is no longer necessary for the liquid 405 to pass through the sieve openings in order to allow the up- and downwards movement of the sieve plate 402 within the liquid 405.

The treatment steps carried out by the stratification machine 400 of FIGS. 4a-4d is similar to the steps being performed by the stratification machine 300 of FIGS. 3a-3d, with the exception that the sieve plate 402 can be moved at a higher speed, thereby improving the efficiency of the stratification or sorting process. Thus, there is three types of granular matter 404 with different densities, with each of these three types of granular matter having a density being larger than the density of the liquid 405, where the liquid used is water. Other suitable liquids, including water with additives that alter the density, may also be used. Also, for the treatment process illustrated in FIGS. 4a-4d, the three types of granular matter are fed into the stratification chamber 401 together with the liquid 405, where the liquid now is provided both within the stratification chamber 401 and the outer chamber 408. The drive system 403 is now activated and moves the sieve plate 402 in vertical upwards and downwards movements within the stratification chamber 401 to thereby exercise or treat the granular matter 404 within the liquid 405. The amount of liquid 405 within the chambers 401 and 408 should be large enough to ensure that the granular matter 404 is fully covered by the liquid during these upwards and downwards movements of the plate 402 when exercising or treating the granular matter 404.

FIG. 4a shows the stratification machine 400 in a start or resting position, where the moveable plate sieve 402 is in a first and lower position at a distance above a bottom 406 of the outer chamber 408, with liquid being provided in the lower chamber part 407 between the bottom 406 of the outer chamber 408 and the plate sieve 402, while the granular matter 404 rests on top of the plate sieve 402 within the liquid 405 and below the upper surface of the liquid 405. In this resting position the upper surface of the liquid 405 reaches the same level at both chambers 401 and 408.

In FIG. 4b the plate sieve 402 is moved upwards at a relatively high speed to a second and higher position by the drive system 403, thereby pushing the granular matter 404 upwards within the liquid 405. During this upwards movement, the passage of liquid 405 through the sieve openings of the plate 402 is partly prevented by the granular matter 404, and liquid 405 is supplied from the outer chamber 408 to the lower chamber part 407 to stabilize a pressure change within the lower chamber part 407. Here, when the upwards movement of the sieve plate 402 has just ended, the upper surface of the liquid 405 reaches a higher level at the stratification chamber 401 while reaching a lower level in the outer chamber 408.

In FIG. 4c the plate sieve 402 is moved downwards at a relatively high speed to the first lower position by the drive system 403, preferably at a speed by so high that at least part of the granular matter 404 is floating within the liquid 405 before being settled on top of the plate sieve 402. During this downwards movement, liquid 405 is supplied from the lower chamber part 407 to the outer chamber 408 to stabilize a pressure change within the lower chamber part 407. Here, when the downwards movement of the sieve plate 402 has just ended, the upper surface of the liquid 405 reaches a lower level at the stratification chamber 401 while reaching a higher level in the outer chamber 408.

After a series or number of upwards and downwards movements of the plate sieve 402 with resting or settlement periods following each or at least part of the downwards movement, the granular matter 404 starts to settle on top of the plate sieve 402 in a stratified or sorted order as illustrated in FIG. 4d. The granular matter 404 having the highest density will settle at the lowest position, the granular matter 404 having the middle density will settle at a middle position, and the granular matter 404 having the lowest density will settle at the upper position. In FIG. 4d the stratification machine 400 is in a resting position with the upper surface of the liquid 405 reaching the same level at both chambers 401 and 408.

FIGS. 5a-5d are schematic drawings illustrating steps of treating a combination of a liquid and a granular matter by use of a third type of a stratification or sorting system according to an example embodiment.

FIGS. 5a-5d are schematic drawings illustrating steps of treating a combination of a liquid 505 and a granular matter 504 by use of a third type of a stratification or sorting machine 500 according to an example embodiment. The stratification or sorting machine 500 differs from the stratification machine 400 of FIGS. 4a-4d in that the machine 500 holds a fluid compensation system being a bit different to the fluid compensation system of the stratification machine 400.

Thus, FIGS. 5a-5d show a stratification machine 500 with a stratification or sorting chamber 501 with sidewalls and a bottom 506 for holding the combination of liquid 505 and granular matter 504. Also here, a movable plate 502 is arranged within the stratification chamber 501, where the moveable plate 502 has an outer edge or edges being closely positioned to the one or more side walls of the stratification chamber 501 with any distances between the outer edge(s) and the one or more sidewalls being smaller than the minimum grain size of the granular matter to be treated. The moveable plate 502 is a plate sieve with sieve openings smaller than the minimum grain size of the granular matter to be treated to thereby maintain the granular matter above or on top of the movable plate. A drive system 503 is provided for moving the movable plate 502 in vertical upwards and downwards movements within the stratification chamber 501 to thereby exercise or treat the granular matter 504 within the liquid 505. The drive system 503 is movably inserted into the stratification chamber 501 via a fluid tight connection at the bottom 506 of the stratification chamber 501.

The machine 500 holds a fluid compensation system being at least partly provided by one or more outer fluid pipes 508 having an open top end and lower end part, which is fluidly connected to a lower part of the side walls of the stratification chamber 501 below a lower surface of the sieve plate 502. The movable plate 502 is positioned at a distance above the bottom 506 of the chamber 501 thereby defining a lower chamber part 507 between an upper surface of the bottom 506 of the chamber 501 and a lower surface of the movable plate 502. This lower chamber part 507 has a change in volume by upwards or downwards movement of the movable plate 502 within the stratification chamber 501.

The arrangement of the stratification chamber 501, the sieve plate 502 and the outer fluid pipes 508 thus provides a fluid compensation system, whereby liquid 505 can be supplied from the outer fluid pipes 508 to the lower chamber part 507, when the volume of the lower chamber part 507 is increased, and liquid can be received by the outer fluid pipes 508 from the lower chamber part 507 when the volume of the lower chamber 507 part is decreased.

The treatment steps carried out by the stratification machine 500 of FIGS. 5a-5d is similar to the steps being performed by the stratification machine 400 of FIGS. 4a-4d. Thus, there is three types of granular matter 504 with different densities, with each of these three types of granular matter having a density being larger than the density of the liquid 505, where the liquid used is water. Other suitable liquids, including water with additives that alter the density, may also be used. Also, for the treatment process illustrated in FIGS. 5a-5d, the three types of granular matter are fed into the stratification chamber 501 together with the liquid 505, where the liquid now is provided both within the stratification chamber 501 and the outer fluid pipes 508. The drive system 503 is now activated and moves the sieve plate 502 in vertical upwards and downwards movements within the stratification chamber 501 to thereby exercise or treat the granular matter 504 within the liquid 505. The amount of liquid 505 within the chamber 501 and the fluid pipes 508 should be large enough to ensure that the granular matter 504 is fully covered by the liquid during these upwards and downwards movements of the plate 502 when exercising or treating the granular matter 504.

Figures 5A, 5B:
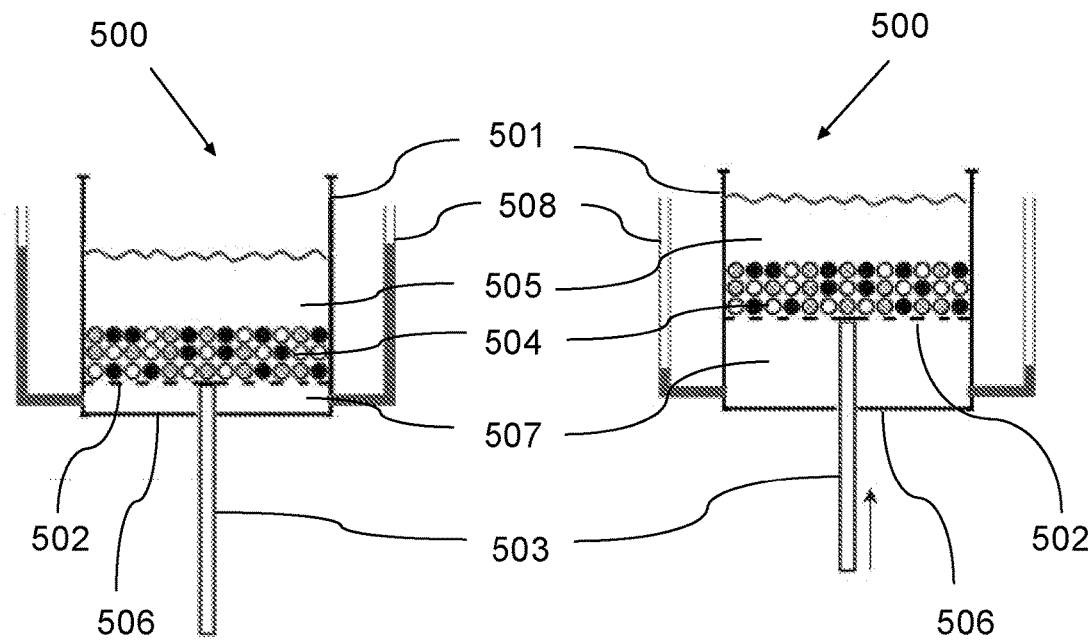
FIGS. 5a-5d are schematic drawings illustrating steps of treating a combination of a liquid and a granular matter by use of a third type of a stratification or sorting system according to an example embodiment.

FIG. 5a shows the stratification machine 500 in a start or resting position, where the moveable plate sieve 502 is in a first and lower position at a distance above the bottom 506 of the stratification chamber 508, with liquid being provided in the lower chamber part 507 between the bottom 506 and the plate sieve 502, while the granular matter 504 rests on top of the plate sieve 502 within the liquid 505 and below the upper surface of the liquid 505. In this resting position the upper surface of the liquid 505 reaches the same level at the chamber 501 and the fluid pipes 508.

In FIG. 5b the plate sieve 502 is moved upwards at a relatively high speed to a second and higher position by the drive system 503, thereby pushing the granular matter 504 upwards within the liquid 505. During this upwards movement, the passage of liquid 505 through the sieve openings of the plate 502 is partly prevented by the granular matter 504, and liquid 505 is supplied from the outer fluid pipes 508 to the lower chamber part 507 to stabilize a pressure change within the lower chamber part 507. Here, when the upwards movement of the sieve plate 502 has just ended, the upper surface of the liquid 505 reaches a higher level at the stratification chamber 501 while reaching a lower level in the outer fluid pipes 508.

Figures 5C, 5D:
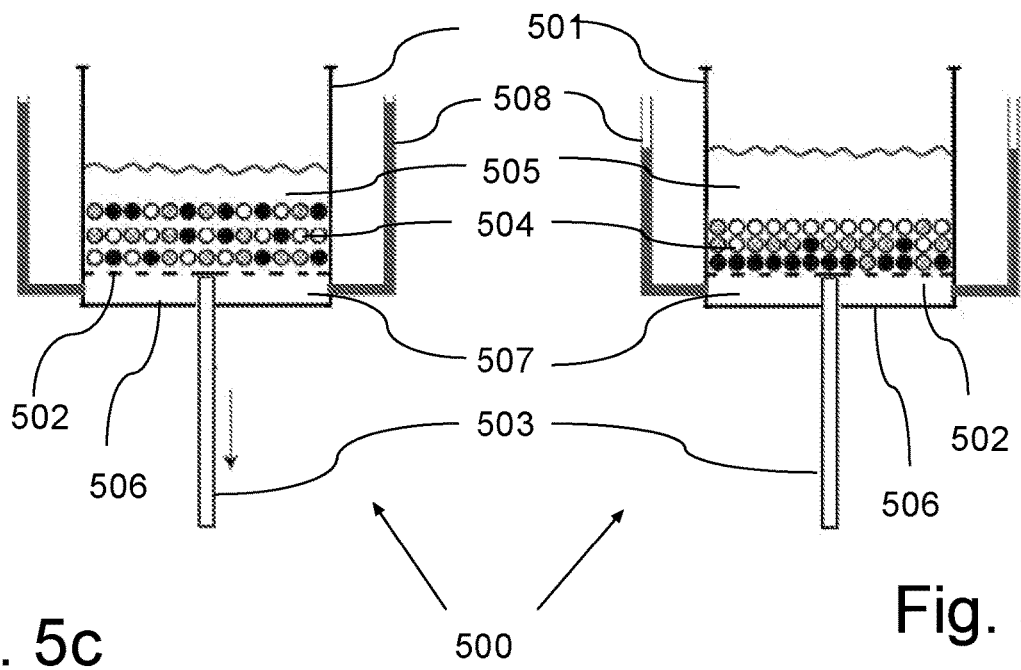

In FIG. 5c the plate sieve 502 is moved downwards at a relatively high speed to the first lower position by the drive system 503, preferably at a speed by so high that at least part of the granular matter 504 is floating within the liquid 505 before being settled on top of the plate sieve 502. During this downwards movement, liquid 505 is supplied from the lower chamber part 507 to the outer fluid pipes 508 to stabilize a pressure change within the lower chamber part 507. Here, when the downwards movement of the sieve plate 502 has just ended, the upper surface of the liquid 505 reaches a lower level at the stratification chamber 501 while reaching a higher level in the outer fluid pipes 508.

After a series or number of upwards and downwards movements of the plate sieve 502 with resting or settlement periods following each or at least part of the downwards movement, the granular matter 504 starts to settle on top of the plate sieve 502 in a stratified or sorted order as illustrated in FIG. 5d. The granular matter 504 having the highest density will settle at the lowest position, the granular matter 504 having the middle density will settle at a middle position, and the granular matter 504 having the lowest density will settle at the upper position. In FIG. 5d the stratification machine 500 is in a resting position with the upper surface of the liquid 505 reaching the same level at both the stratification chambers 501 and the fluid pipes 508.

As described above, then when treating the combination of liquid 305, 405, 505 and granular matter 304, 404, 504 for stratifying the granular matter into layers, there should be a resting or settlement period from the end of a downwards movement before initiating a new upwards movement of the granular matter 304, 404, 504 within the liquid 305, 405, 505. This resting period may have a minimum length determined according to the ratio of the density of the liquid 305, 405, 505 in the stratification chamber 301, 401, 501 and the density of the granular matter 304, 404, 504 having the highest density. It is preferred that resting period before i is at least 0.5 seconds.

During the treatment or stratification process, the movements of the movable plate 302, 402, 502 may be controlled to be between a lower or resting position and a predetermined first maximum upper position, where the first maximum upper position is determined based on the amount of liquid 305, 405, 505 and granular matter 304, 404, 504 within the stratification machine 300, 400, 500, to thereby ensure that the granular matter 304, 404, 504 is all covered by the liquid 305, 405, 505 when the movable plate 302, 402, 502 reaches the first maximum upper position. The distance between the lower position and the first maximum upper position may be determined according to the ratio of volume of granular matter 304, 404, 504 to the total volume of the liquid 305, 405, 505 in the stratification machine 300, 400, 500.

It has been found that the acceleration and the velocity of the upwards movement and downwards movement may have an influence on the efficiency of the treatment or stratification result. Here, an acceleration of an upwards movement and/or a downwards movement may be determined according to the ratio of volume of granular matter 304, 404, 504 to the total volume of the liquid 305, 405, 505 in the stratification machine 300, 400, 500. Also, the velocity of an upwards movement and/or a downwards movement may be determined according to the ratio of volume of granular matter 304, 404, 504 to the total volume of the liquid 305, 405, 505 in the stratification machine 300, 400, 400.

When the granular matter 304, 404, 504 to be sorted has been stratified into a corresponding number of separate layers following one of the processes described in connection with FIGS. 3-5, the sorted granular matter 304, 404, 504 need to be discharged from the stratification chamber 301, 401, 501. The discharged matter may then by exposed to a drying process, see 203 of FIG. 2, followed by a process of identification, 204 of FIG. 2, in order to secure separation of the sorted granular matter, and finally the separated granular matter may be packed, 205 of FIG. 2.

FIGS. 6a-6e are schematic drawings illustrating steps of discharging and identifying granular matter 604a,b,c of three different densities being treated by use of a stratification or sorting machine 600 system according to an example embodiment.

Figure 6A:
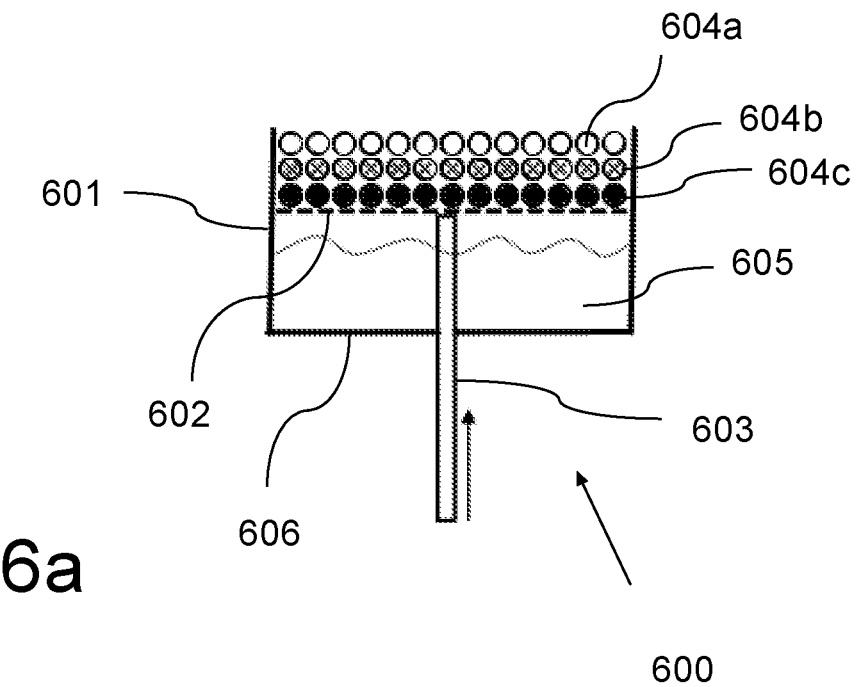
FIGS. 6a-6e are schematic drawings illustrating steps of discharging and identifying granular matter being treated by use of a stratification or sorting system according to an example embodiment.
Figure 6B:
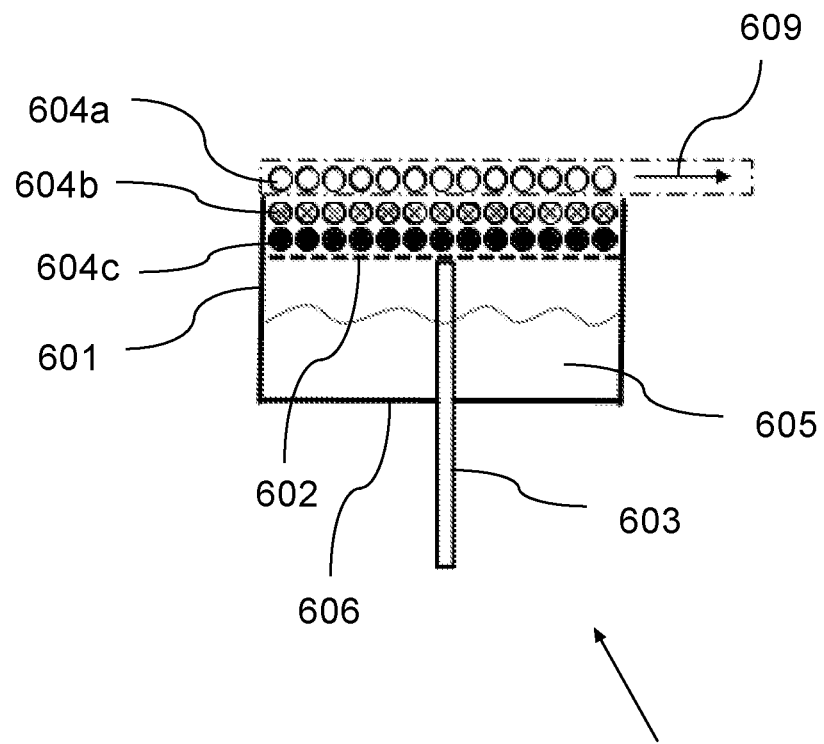
Figure 6C:
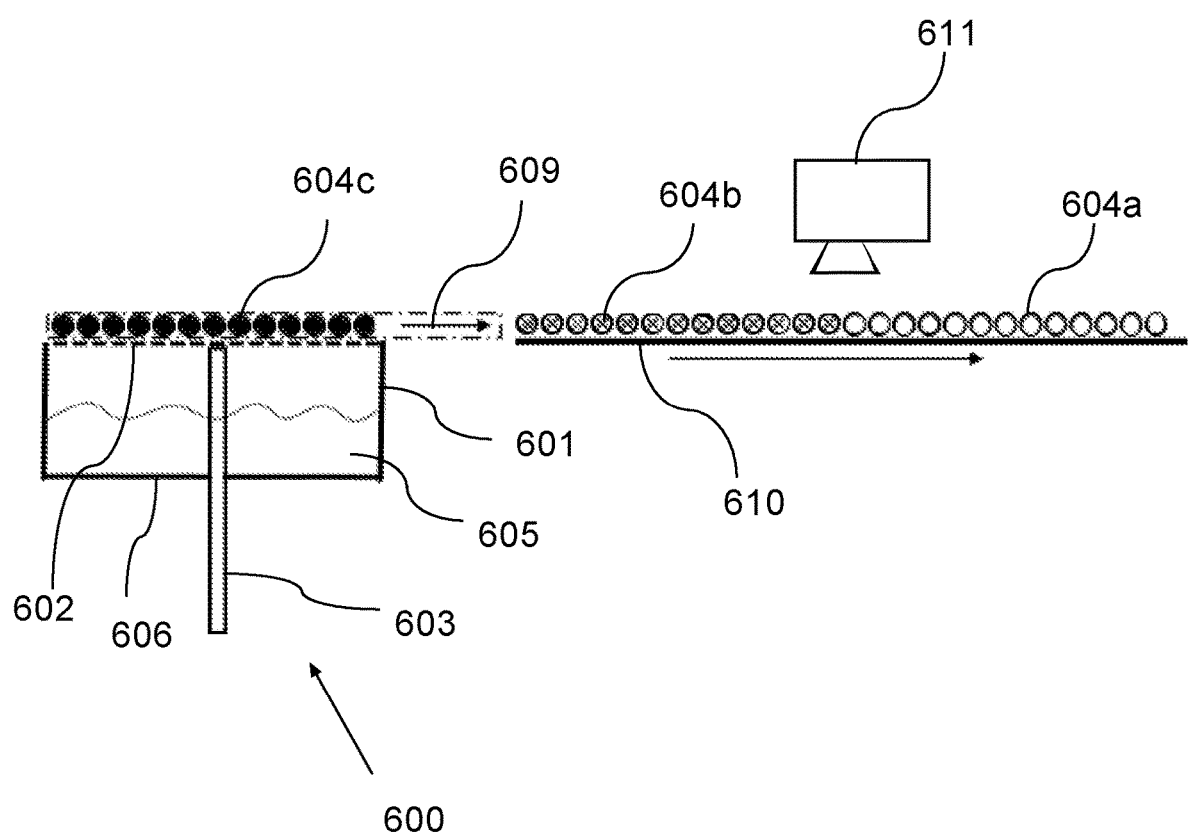

FIGS. 6a-6c show a stratification machine 600 comprising a stratification chamber 601 for holding a combination of liquid 605 and granular matter 604a,b,c, which stratification chamber 601 has side walls and a bottom 606. A movable plate 602 is arranged within the stratification chamber 601, where the moveable plate 602 has an outer edge or edges being closely positioned to the one or more side walls of the stratification chamber 601 with any distances between the outer edge(s) and the one or more sidewalls being smaller than the minimum grain size of the granular matter to be treated. The moveable plate 602 is a plate sieve with sieve openings smaller than the minimum grain size of the granular matter to be treated to thereby maintain the granular matter above or on top of the movable plate. A drive system 603 is provided for moving the movable plate 602 in vertical upwards and downwards movements within the stratification chamber 601 to thereby exercise or treat the granular matter 604a,b,c within the liquid 605. The drive system 603 is movably inserted into the stratification chamber 601 via a fluid tight connection at the bottom of the stratification chamber 601.

The sieve plate 602 and the drive system 603 function as part of a discharging system, which is illustrated in FIG. 6a. In FIG. 6a the granular matter 604a,b,c has been stratified into three separate layers 604a, 604b and 604c. The granular matter 604c having the highest density is settled at the bottom layer, the granular matter 604b having the middle density is settled at the middle layer, and the granular matter 604a having the lowest density is settled at the upper layer.

The first step of the discharging process is to raise the sieve plate 602 by use of the drive system 603 to a position as shown in FIG. 6a, where the sieve plate 602 carrying the granular matter 604a,b,c is fully above the surface of the liquid 605. The sieve plate 602 may be held in this position for a while in order to let liquid drip off from the granular matter 604a,b,c.

The next steep of the discharging process is illustrated in FIG. 6b, in which the sieve plate 602 is raised to a level at which the upper layer of granular matter 604a is above the sidewalls of the stratification chamber 601 to be discharged, as indicated by the arrow 609. The granular matter 604a,b,c is now discharged layer by layer, with the sieve plate 602 being raised accordingly, see FIG. 6c. The discharged granular matter 604a,b,c can be moved onto a conveyer belt 610 from where the discharged granular matter 604a,b,c may be scanned by a suitable density identification system 611. The density identification system 611 may comprise a mid-infrared (MIR) type device.

Although not shown here, the discharged granular matter 604a,b,c may be dried after being discharged. To this end, the discharged granular matter 604a,b,c may be passed under a drying device when moved forward on the conveyer belt 610.

Figure 6D:
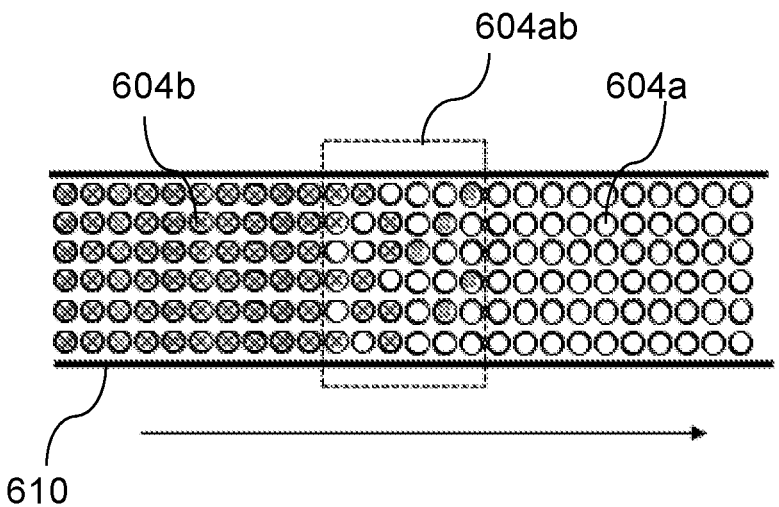

FIG. 6d shows a top view of the first two discharged layers of granular matter 604a and 604b being moved forward on the conveyer belt 610. There is not a sharp transition from the first granular matter of lowest density 604a to the next granular matter of a higher density 604b, as there will be a transition zone in which there is a mixture of granular matter 604ab of both densities. The density identification system 611 may thus identify or determine which part of the discharged granular matter 604a,b,c represents the first granular matter 604a only, which part can then be removed from the conveyer belt 610 and filled or packed into a first container 612, see FIG. 6e. The density identification system 611 may also identify or determine which part of the discharged granular matter represents a mixture of the first and second granular matter 604a and 604b, which mixture part 604ab can then be removed from the conveyer belt 610 and sent back to the stratification chamber 601 for re-sorting or re-stratification. After identifying and removing the mixed part 604ab, the density identification system 611 may then identify or determine which part of the discharged granular matter 604a,b,c represents the second granular matter 604b only, which part can then be removed from the conveyer belt 610 and filled or packed into a second container 613.

Figure 6E:
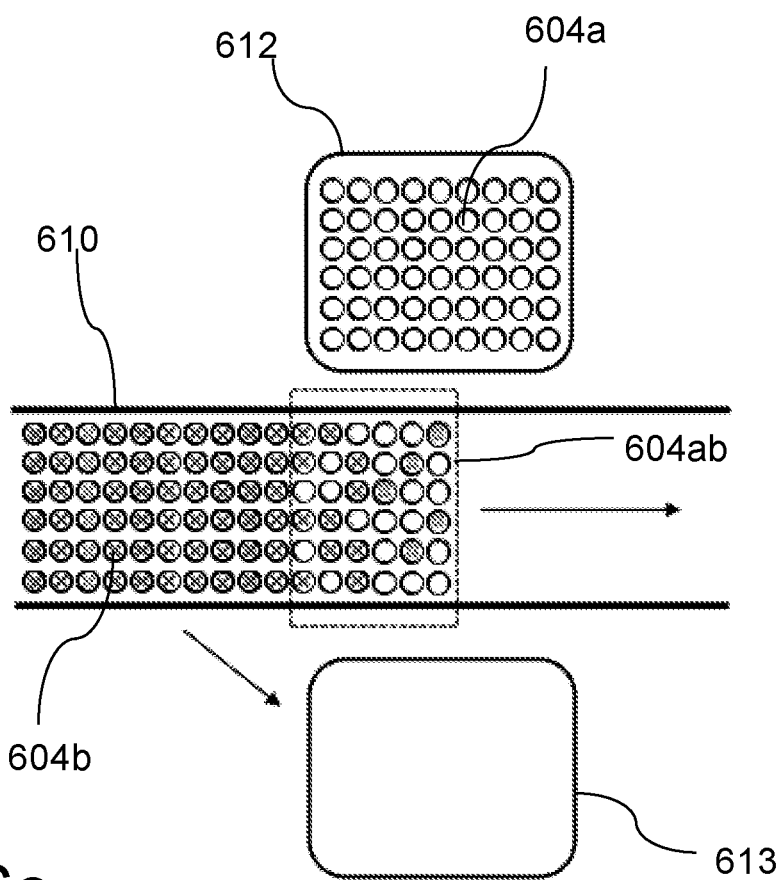

The process is repeated for a following transition zone, not shown in FIG. 6e, in which there is a mixture part of granular matter 604bc of the middle density and the highest density, which mixture part 604bc can also be removed from the conveyer belt 610 and sent back to the stratification chamber 601 for re-sorting or re-stratification. Finally, the density identification system 611 may then identify or determine which part of the discharged granular matter 604a,b,c represents the third granular matter 604c og highest density only, which part can then be removed from the conveyer belt 610 and filled or packed into a third container.

When the stratified granular matter 604a,b,c of three different densities have been fully discharged from the stratification chamber 601, a new batch of mixed granular matter 604a,b,c can be filled into the stratification chamber 601 together with the mixture parts 604ab and 604bc in order to be treated for stratification or sorting, discharging, identifying and packing.

Figure 7:
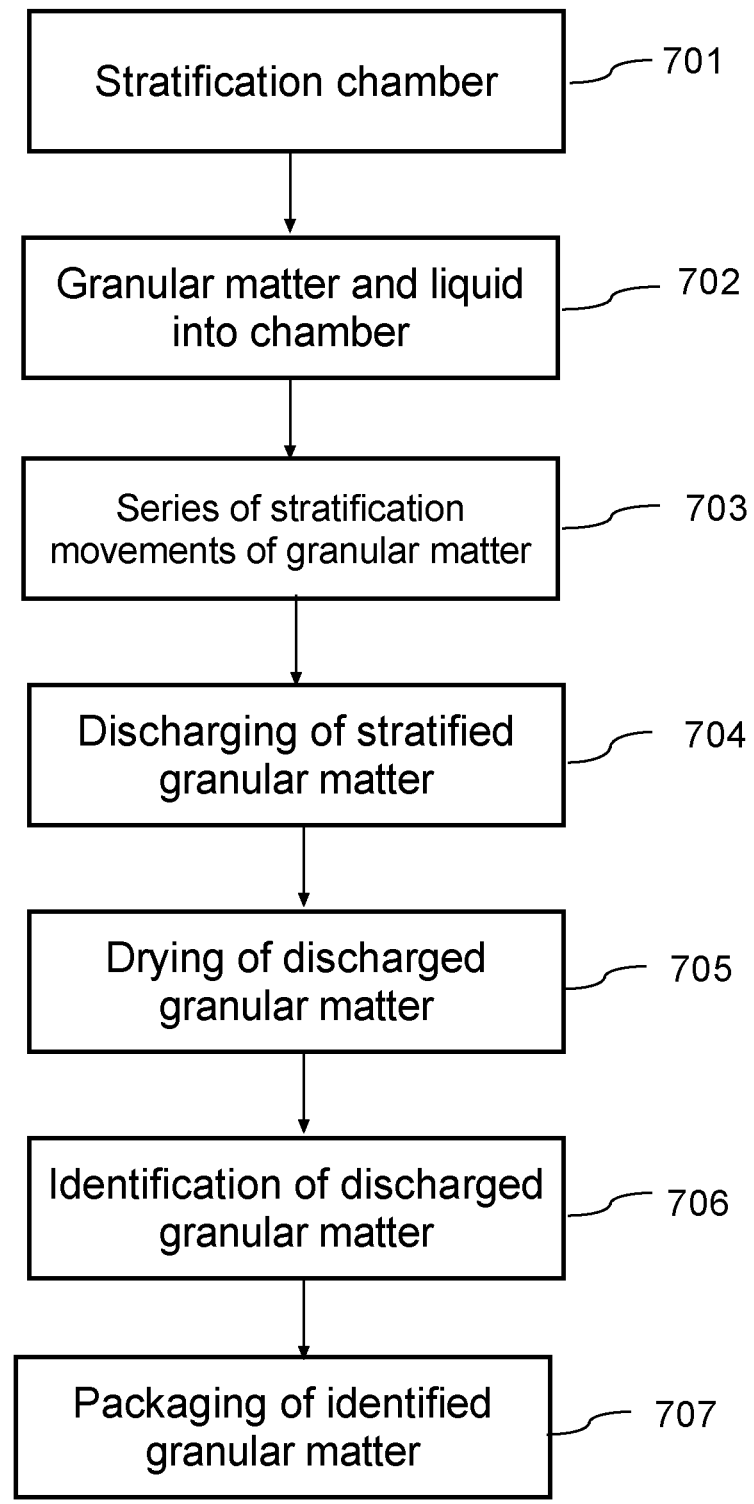
FIG. 7 is an overview block diagram illustrating steps of treating granular matter according to an example embodiment.

FIG. 7 is an overview block diagram illustrating steps of treating granular matter according to an example embodiment. In the first step 701, a system holding a stratification machine with a stratification chamber is provided. Then two or more types of granular matter with different densities and a liquid to be combined with the granular matter is provided, where at least two of the different types of granular matter have densities being larger than the density of the liquid, and the provided granular matter and liquid are filled into the stratification chamber, step 702. The stratification machine holding the stratification chamber may be selected from one the herein described machines 300, 400 and 500, see FIGS. 3, 4 and 5, with the stratification machine 400 of FIG. 4 holding the stratification chamber 401 being preferred.

In step 703, a series of upwards and downwards stratification movements is provided to the granular matter within the liquid. A resting period is provided from the end of the downwards movement before initiating a new upwards movement of the granular matter within the liquid, during which resting period the granular matter may settle within the liquid. When using the stratification machine 400, the upwards and downwards movement are provided by the plate sieve 402 and the drive system 403. After a series of upwards and downwards movements of the plate sieve 402 with resting or settlement periods, the granular matter starts to settle on top of the plate sieve 402 in a stratified or sorted order. The granular matter having the highest density will settle at the lowest position, while the granular matter having the lowest density will settle at the upper position.

The layers of stratified granular matter being the result of step 703 are now discharged layer by layer from the stratification chamber, step 704. When being discharged from the stratification chamber, the granular matter may optionally be exposed to a drying process, step 705, in order to get rid of excess liquid. The different discharged layers of granular matter are then identified, step 706, followed by packaging of the granular matter according to difference in densities, step 707. The discharging, identification and packaging may be performed as described herein in connection with FIGS. 6a-6e.

In a first example, the waste polymer matter comprises only two types of polymer matter with different densities, and the polymer matter is a combination of PC-ABS (Polycarbonate-Acrylonitrile Butadiene Styrene) and POM (Polymethylene). The density of the PC-ABS is 1.26 g/cm$^3$ and the density of the POM is 1.41 g/cm$^3$. A stratification machine 500 of the type illustrated in FIGS. 5a-5d were used, for which the stratification chamber 501 had a capacity of 200 litres, or 0.2 m$^3$. In the first example, 11.25 litres of the PC-ABS and POM respectively are fed into the stratification or sorting chamber 501 followed by 150 litres of water.

The stratification process comprises moving the moveable plate 502 according to a predetermined sorting motion within the stratification or sorting chamber 501. The predetermined sorting motion comprises a series of vertical upstrokes and downstrokes through the liquid 505 in the sorting chamber 501. The vertical upstrokes push the granular matter to be sorted 504 upwards and causes the grains of the matter 504 to move relative to the liquid 505. This relative movement aids the natural tendency of the grains of the granular matter to be sorted 504 to move and settle in the liquid 504 according to their respective densities relative to the liquid 505 (specific density) and the other grains of the granular matter to be sorted 504 in the liquid 505. The relative movement induced in the grains of the granular matter to be sorted 504 aids this natural tendency of the grains to settle according to their specific density as it creates movement in areas where the grains in the liquid 505 may otherwise have been substantially static. Similarly, the downstroke induces movement in the grains of the granular matter to be sorted 504 in the liquid 505 that further affects the settling of the grains and so the efficiency of the stratification process as a whole.

Experiments have shown the amplitude of the upstroke and the downstroke to affect the efficiency of the stratification process. The experimental results also indicate that the optimum amplitudes of the upstroke and downstroke are at least partly dependent on the volume of the granular matter to be sorted 504 and the volume of the liquid 505 in the stratification or sorting chamber 501. More significantly the optimum amplitudes of the upstroke and downstroke seem to be dependent on the ratio of the volume of granular matter to be sorted 504 to the volume of liquid 505 in the first sorting chamber 501. An explanation for this may be that the larger the ratio of volume of the granular matter to be sorted 504 to the volume of liquid 505 is, the more closely packed the grains of the granular matter 504 to be sorted will be, and the more difficult it is for individual grains to move and settle as their movement is restricted by surrounding grains (hindered settling). In a scenario like that, a larger amplitude of upstroke and/or downstroke may be beneficial to the stratification process as it will provide a greater amount of movement in the grains, where the grains may move and settle relative to each other according to their density. However, in cases where the volume of granular matter to be sorted 504 is low relative to the volume of liquid 505, a smaller amplitude of upstroke and/or down stroke may be optimum for the stratification process, as the grains are not as tightly packed and are more easily able to move relative to other grains and settle according to their density, and the grains thus require only a small amount of encouragement to move and settle in the liquid 505. Upstrokes and/or downstrokes of large amplitudes, in this case, may cause the grains to move against their natural settling direction and may cause already settled grains of different densities to mix again and thus negatively impact the stratification process. Therefore, being able to adjust the amplitude of the upstrokes and/or downstrokes according to the ratio of volume of granular matter to be sorted 504 to the volume of the liquid 505 in the stratification or sorting chamber 501 may be highly advantageous in achieving the optimum efficiency of the stratification process. In the first example described herein, the amplitude of the upstroke and downstroke is 60 mm.

It should be noted that although the amplitude of the upstroke and downstroke of the example described herein are equal, this is not a necessity, and the amplitude of the upstroke may be different from the amplitude of the downstroke. Furthermore, subsequent upstrokes and/or downstrokes may have amplitudes that differ from preceding upstrokes and/or downstrokes allowing the efficiency of the stratification process to be further improved as the amplitudes of upstrokes and/or downstrokes may be chosen for optimum stratification efficiency, for example, according to the extent to which the granular matter to be sorted 504 is stratified.

Experiments have also indicated that the velocity and acceleration of the downstroke is particularly important as it may have a significant impact on the settling of the grains of the granular matter to be sorted 504. This is most likely a result of the velocity and acceleration of the downstroke having an influence on the wake that is created and trails the moveable plate 502, as well as potential vortices being created around the moveable plate 502 when it moves downwards through the liquid 505. Both the wake and vortices may cause whirling of the grains and thus negatively impact the natural settling of the grains. Therefore, being able to adjust the acceleration and the velocity of the downstroke of the moveable plate 502 is important in being able to optimise the stratification process for optimum efficiency. Similarly, the velocity and acceleration of the upstroke may be adjusted. In the first example described herein, the velocity for the upstroke and downstroke is 60 mm/s, the acceleration of the upstroke is 800 mm/s$^2$ and the acceleration of the downstroke is 650 mm/s$^2$.

Along with this, the time between ending a downstroke and initiating an upstroke (pause) has shown to have a significant impact on the stratification process its efficiency. This is likely because the pause provides time for the grains, particularly the grains in the upper half of the stratification or sorting chamber 501, to gain downwards movement and to settle according to their specific density, which improves the efficiency of the stratification process. This therefore plays an important role in the stratification of the granular matter to be sorted 504. Similarly, it may be advantageous to be able to adjust the pause between completing an upstroke and initiating a downstroke. In the first example described herein, there is a pause between completing a downstroke and initiating an upstroke of 1 second and a pause of 1 seconds between completing an upstroke and initiating a downstroke.

All of the above-mentioned parameters may be adjusted and/or set as part of the predetermined sorting motion. The parameters need, however, not be fixed for the duration of the stratification process but may be set to change as the stratification process progresses, for example, according to lapsed time or lapsed cycles of the stratification process. In this way the stratification process may be further optimised according to the state of stratification.

The duration of the stratification process may be set and adjusted according to lapsed time or lapsed cycles of the predetermined sorting motion. In the first example described herein, the duration of the stratification process is 600 seconds.

Following the completion of the stratification process, the granular matter to be sorted 504 will have been separated into two layers of sorted granular matter 504 corresponding to the two different types of matter of different densities, in this case PC-ABS and POM respectively. The two layers of sorted granular matter 504 is then discharged from the stratification or sorting chamber 501, following the processes described in connection with FIGS. 6a-6e.

In a second example, the waste polymer matter comprises two types of polymer matter with different densities. Here, the polymer matter is a combination of 30% Thermoplastic polyurethane, TPU, with a density of 1.21 g/cm$^3$, and 70% Polystyrene, PS, with a density of 1.12 g/cm$^3$. The polymer matter is granulated to a size ranging from 2 mm to 30 mm, having shapes ranging from thin flakes to spherical. The total amount of polymer matter being treated is 150 kg. A stratification machine 400 of the type illustrated in FIGS. 4a-4d were used, for which the stratification chamber 401 had an inner diameter of 1000 mm and a height of 750 mm when measured from the bottom 406. The movable plate 402 had a diameter of 999 mm holding sieve openings with a diameter of 1.5 mm. The 150 kg of polymer matter was filled into the stratification chamber, and 650 litres of water were filled into the stratification chamber 401 and the outer chamber 408.

The second example includes two different treatment processes, which were performed with different resting or pausing periods from the end of downwards movement of the movable plate 402 to the start of an upwards movement of the moveable plate 402, and with different movement amplitudes for the moveable plate 402.

The first treatment process of the second example is divided in two parts, where the data for movement of the moveable plate 402 for the first part are as follows:

Total duration of treatment or process time of the first part: 500 seconds.

Amplitude of movement: 110 mm.

Speed of upstroke or upwards movement: 20 mm/s.

Speed of downstroke or downwards movement: 20 mm/s.

Acceleration of upstroke or upwards movement: 1500 mm/s$^2$.

Acceleration of downstroke or downwards movement: 1500 mm/s².

Pause period between downwards and upwards movement: 8 seconds.

For the second part of the first treatment process of the second example, the data for movement of the moveable plate 402 is as follows:

Total duration of treatment or process time of the second part: 700 seconds.

Amplitude of movement: 60 mm.

Speed of upstroke or upwards movement: 20 mm/s.

Speed of downstroke or downwards movement: 20 mm/s.

Acceleration of upstroke or upwards movement: 1500 mm/s².

Acceleration of downstroke or downwards movement: 1500 mm/s².

Pause period between downwards and upwards movement: 6 seconds.

Thus, the total process time for the first treatment process was (500+700) seconds equal to 1200 seconds, where the amplitude of movement is changed from 110 mm to 60 mm from the first part to the second part and the pause period is changed from 8 seconds to 6 seconds from the first part to the second part.

After finishing the first and second parts of the first sorting or treatment processes of the second example, the amount of Polystyrene, PS, having the lower density and the amount of Thermoplastic polyurethane, TPU, having the higher a density were calculated for the top layer of material and the bottom layer of material within the stratification or sorting chamber. The result for the first treatment process showed larger than 98.5% Polystyrene, PS, in the top layer, and larger than 98.5% Thermoplastic polyurethane, TPU, in the bottom layer. These results are considered as a success.

For the second treatment process of the second example, the data for movement of the moveable plate 402 is as follows:

Total duration of treatment or process time: 1200 seconds.

Amplitude of movement: 60 mm.

Speed of upstroke or upwards movement: 20 mm/s.

Speed of downstroke or downwards movement: 20 mm/s.

Acceleration of upstroke or upwards movement: 1500 mm/s².

Acceleration of downstroke or downwards movement: 1500 mm/s².

Pause period between downwards and upwards movement: 2 seconds.

The result for the second treatment process of the second example showed 80% Polystyrene, PS, in the top layer, and 82% Thermoplastic polyurethane, TPU, in the bottom layer. This result is considered non-satisfactory, showing that a pause period of 2 seconds is too small for the heavier granular matter to fully settle at the bottom of the stratification or sorting chamber.

In a third example, the waste polymer matter comprises three types of polymer matter with different densities. Here, the polymer matter is a combination of 50% Polyoxymethylene, POM, with a density of 1.41 g/cm³, 25% Acrylonitrile butadiene styrene, ABS, with a density of 1.08 g/cm³, and 25% Polycarbonate/Acrylonitrile butadiene styrene, PC/ABS, with a density of 1.13 g/cm³. The polymer matter is granulated to a size ranging from 2 mm to 30 mm, having shapes ranging from thin flakes to tubes. The total amount of polymer matter being treated is 150 kg. The stratification machine 400 being used in the second example is also used for in the third example.

The third example also includes two different treatment processes with different resting or pausing periods from the end of downwards movement of the movable plate 402 to the start of an upwards movement of the moveable plate 402, different movement amplitudes for the moveable plate 402, and different speeds for the downwards movement of the moveable plate 402.

The first treatment process of the third example is also divided in two parts, where the data for movement of the moveable plate 402 for the first part are as follows:

Total duration of treatment or process time of the first part: 500 seconds.

Amplitude of movement: 120 mm.

Speed of upstroke or upwards movement: 20 mm/s.

Speed of downstroke or downwards movement: 40 mm/s.

Acceleration of upstroke or upwards movement: 1500 mm/s².

Acceleration of downstroke or downwards movement: 1500 mm/s².

Pause period between downwards and upwards movement: 6 seconds.

For the second part of the first treatment process of the third example, the data for movement of the moveable plate 402 is as follows:

Total duration of treatment or process time of the second part: 700 seconds.

Amplitude of movement: 70 mm.

Speed of upstroke or upwards movement: 20 mm/s.

Speed of downstroke or downwards movement: 40 mm/s.

Acceleration of upstroke or upwards movement: 1500 mm/s².

Acceleration of downstroke or downwards movement: 1500 mm/s².

Pause period between downwards and upwards movement: 5 seconds.

Thus, the total process time for the first treatment process was (500+700) seconds equal to 1200 seconds, where the amplitude of movement is changed from 120 mm to 70 mm from the first part to the second part and the pause period is changed from 6 seconds to 5 seconds from the first part to the second part.

After finishing the first and second parts of the first sorting or treatment processes of the third example, the amount of Acrylonitrile butadiene styrene, ABS, having the lower density, the amount of Polycarbonate/Acrylonitrile butadiene styrene, PC/ABS, having the middle density, and the amount of Polyoxymethylene, POM, having the higher a density were calculated for the top layer of material, the middle layer, and the bottom layer of material within the stratification or sorting chamber. The result for the first treatment process showed larger than 98.5% Acrylonitrile butadiene styrene, ABS, in the top layer, larger than 95.5% Polycarbonate/Acrylonitrile butadiene styrene, PC/ABS, in the middle layer, and larger than 98.5% Polyoxymethylene, POM, in the bottom layer. These results are considered as a success.

It has been found that by dividing the total treatment process in two parts with different amplitude of movement for the moveable plate 402, an improved result may be obtained for the final sorted products.

For the second treatment process of the third example, the data for movement of the moveable plate 402 is as follows:

Total duration of treatment or process time: 1200 seconds.

Amplitude of movement: 80 mm.

Speed of upstroke or upwards movement: 20 mm/s.

Speed of downstroke or downwards movement: 20 mm/s.

Acceleration of upstroke or upwards movement: 1500 mm/s$^2$.

Acceleration of downstroke or downwards movement: 1500 mm/s$^2$.

Pause period between downwards and upwards movement: 6 seconds.

The result for the second process of the third example showed 77% Acrylonitrile butadiene styrene, ABS, in the top layer, 70% Polycarbonate/Acrylonitrile butadiene styrene, PC/ABS, in the middle layer, and 82% Polyoxymethylene, POM, in the bottom layer. This result is considered non-satisfactory, showing that although the pause period is 6 seconds, which is higher than the 5 seconds used for second process of the third example, this is not enough to compensate for the lowering in speed of the downstroke, which is lowered from 40 mm/s to 20 mm/s. It is noticed that the heaviest material, POM, of the third example has a density 1.41 g/cm$^3$, while the heaviest material, TPU, of the second example has a density of 1.21 g/cm$^3$, which may indicate that for heavier materials, the downstroke speed shall be higher compared to lighter materials.

In a fourth example, the waste polymer matter comprises three types of polymer matter with different densities. Here, the polymer matter is a combination of 20% Polyethylene, PE, with a density of 0.93 g/cm$^3$, which is lower that the density of water being used a liquid for the process, 70% Polyethylene terephthalate, PET, with a density of 1.38 g/cm$^3$, and 10% rubber with a density of 1.52 g/cm$^3$. The PE and PET polymer matter is granulated to a size ranging from 2 mm to 30 mm, having shapes ranging from thin flakes to tubes. The rubber pieces have a solid cylindrical shape with a diameter of 5 mm and ranging in length from 1 mm to 20 mm. The total amount of polymer matter being treated is 150 kg. The stratification machine 400 being used in the second and third examples is also used for in the fourth example. The 150 kg of polymer matter was filled into the stratification chamber, and 650 litres of water were filled into the stratification chamber 401 and the outer chamber 408.

The fourth example includes one treatment process, which is divided in two parts. Since the Polyethylene, PE, has a lower density than water, PE will float on top in the water, while the Polyethylene terephthalate, PET, and rubber will drop into the water. Thus, for the first part of the sorting or treatment process, the mixture of PE, PET and rubber must be shaken up a bit within the water, to make sure that all the PE floats in the top layer, and that the rubber has dropped to the bottom layer. Thus, a larger amplitude and longer pause period is needed for the first part of the process. The data for movement of the moveable plate 402 for the first part are as follows:

Total duration of treatment or process time of the first part: 1000 seconds.

Amplitude of movement: 120 mm.

Speed of upstroke or upwards movement: 30 mm/s.

Speed of downstroke or downwards movement: 40 mm/s.

Acceleration of upstroke or upwards movement: 1500 mm/s$^2$.

Acceleration of downstroke or downwards movement: 1500 mm/s$^2$.

Pause period between downwards and upwards movement: 5 seconds.

For the second part of the treatment process of the fourth example, the data for movement of the moveable plate 402 is as follows:

Total duration of treatment or process time of the second part: 1000 seconds.

Amplitude of movement: 55 mm.

Speed of upstroke or upwards movement: 30 mm/s.

Speed of downstroke or downwards movement: 40 mm/s.

Acceleration of upstroke or upwards movement: 1500 mm/s$^2$.

Acceleration of downstroke or downwards movement: 1500 mm/s$^2$.

Pause period between downwards and upwards movement: 1 seconds.

Thus, the total process time for the treatment process was (1000+1000) seconds equal to 2000 seconds, where the amplitude of movement is changed from 120 mm to 55 mm from the first part to the second part and the pause period is changed from 5 seconds to 1 seconds from the first part to the second part.

After finishing the first and second parts of the sorting or treatment process of the fourth example, the amount of Polyethylene, PE, having the lower density, the amount of Polyethylene terephthalate, PET, having the middle density, and the amount of rubber having the higher a density were calculated for the top layer of material, the middle layer, and the bottom layer of material within the stratification or sorting chamber. The final result for the treatment process showed larger than 99% Polyethylene, PE, in the top layer, larger than 98.5% Polyethylene terephthalate, PET, in the middle layer, and larger than 90% rubber in the bottom layer. These results are considered as a success.

In a fifth example, the waste polymer matter comprises three types of polymer matter with different densities. Here, the polymer matter is a combination 35% Acrylonitrile butadiene styrene, ABS, with a density of 1.04 g/cm$^3$, and 35% Polycarbonate, PC, with a density of 1.2/cm$^3$, and 30% Polyoxymethylene, POM, with a density of 1.4 g/cm$^3$. The polymer matter is granulated to a size ranging from 2 mm to 30 mm, having shapes ranging from thin flakes to tubes. The total amount of polymer matter being treated is 150 kg. The stratification machine 400 being used in the second, third and fourth examples is also used for in the fifth example. The 150 kg of polymer matter was filled into the stratification chamber, and 650 litres of water were filled into the stratification chamber 401 and the outer chamber 408.

The fifth example includes one treatment process, which is divided in three parts. These three parts hold three series of upwards and downwards movements of granulated polymer within the liquid, which series have different resting or pausing periods from the end of downwards movement of the movable plate 402 to the start of an upwards movement of the moveable plate 402, different movement amplitudes for the moveable plate 402, and different speeds for the downwards movement of the moveable plate 402.

For the fifth example, the data for movement of the moveable plate 402 for the first part or the first series of movements are as follows:

Total duration of treatment or process time of the first part: 600 seconds.

Amplitude of movement: 110 mm.

Speed of upstroke or upwards movement: 20 mm/s.

Speed of downstroke or downwards movement: 20 mm/s.

Acceleration of upstroke or upwards movement: 1500 mm/s$^2$.

Acceleration of downstroke or downwards movement: 1500 mm/s$^2$.

Pause period between downwards and upwards movement: 8 seconds.

For the second part or the second series of movements of the treatment process of the fifth example, the data for movement of the moveable plate 402 is as follows:

Total duration of treatment or process time of the second part: 600 seconds.
Amplitude of movement: 90 mm.
Speed of upstroke or upwards movement: 20 mm/s.
Speed of downstroke or downwards movement: 30 mm/s.
Acceleration of upstroke or upwards movement: 1500 mm/s².
Acceleration of downstroke or downwards movement: 1500 mm/s².
Pause period between downwards and upwards movement: 6 seconds.

For the third part or the third series of movements of the treatment process of the fifth example, the data for movement of the moveable plate 402 is as follows:
Total duration of treatment or process time of the second part: 1000 seconds.
Amplitude of movement: 60 mm.
Speed of upstroke or upwards movement: 40 mm/s.
Speed of downstroke or downwards movement: 40 mm/s.
Acceleration of upstroke or upwards movement: 1500 mm/s².
Acceleration of downstroke or downwards movement: 1500 mm/s².
Pause period between downwards and upwards movement: 3 seconds.

Thus, the total process time for the treatment process of the fifth example was (600+600+1000) seconds equal to 2200 seconds, where the amplitude of movement is changed and decreased from 110 mm to 90 mm and to 60 mm from the first part, to the second part and to the third part, and the pause period is changed and decreased from 8 seconds to 6 seconds and to 3 seconds from the first part to the second part and to the third part. Also, the speed for the downwards movement of the moveable plate 402 is changed by being increased from 20 mm/s to 30 mm/s and to 40 mm/s from the first part to the second part and to the third part.

After finishing the first, second and third parts of the sorting or treatment process of the fifth example, the amount of Acrylonitrile butadiene styrene, ABS, having the lower density, the amount of Polycarbonate, PC, having the middle density, and the amount of Polyoxymethylene, POM, having the higher density were calculated for the top layer of material, the middle layer, and the bottom layer of material within the stratification or sorting chamber. The result for the treatment process showed larger than 99.5% Acrylonitrile butadiene styrene, ABS, in the top layer, larger than 99.5% Polycarbonate, PC, in the middle layer, and larger than 99.5% Polyoxymethylene, POM, in the bottom layer. These results are considered as a success.

Figure 8:
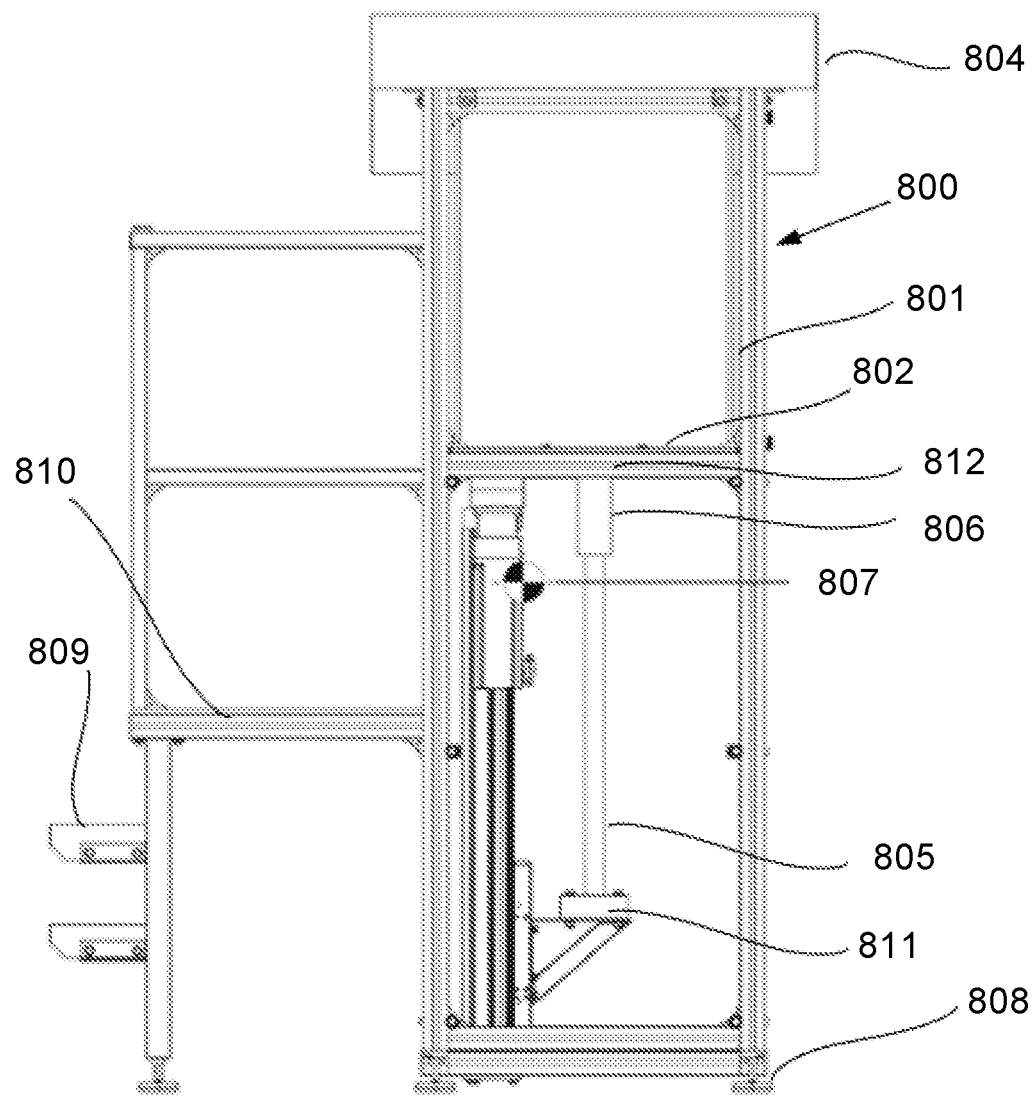
FIG. 8 is a schematic drawing of a stratification or sorting system according to an example embodiment.

FIG. 8 is a schematic drawing of a stratification or sorting machine or apparatus according to an example embodiment. The stratification machine of FIG. 8 holds a stratification or sorting chamber 800, which is of a rectangular shape defined by the sidewalls 801 and has a capacity of 0.2 m³. A moveable plate 802 is arranged inside the stratification or sorting chamber 800 with any distances between the outer edge of the plate 802 and the sidewalls 801 being smaller than the minimum grain size of the granular matter to be treated. A drive shaft 805 is connected to the moveable plate 802 through an opening in the base 812 of the stratification or sorting chamber 800 and is sealed by a chamber seal 900, see FIG. 9. The chamber seal 900 is located in the opening in the base 812 and seals both against the stratification or sorting chamber 800 and the shaft 805 to prevent liquid from escaping out of the stratification or sorting chamber 800. The shaft 805 is connected to a linear drive unit 807 through a shaft connector 811. This allows the moveable plate 802 to be moved and enables control and adjustability of the motion of the moveable plate 802. Although not shown here, a control unit with a display may be provided to improve the ease of control and operation of the stratification or sorting machine.

The bottom of the stratification machine apparatus comprises four adjustable feet 808, which allow adjustment of the machine to ensure that it is level. A side of the machine comprises a platform 810 with steps 809 which allow a user to inspect and/or load the stratification or sorting chamber 800.

When the stratification or sorting chamber 800 has been filled with granular matter to be sorted and a liquid and the stratification process has been started, the linear drive unit 807 drives the shaft 805, and in turn the moveable plate 802, according to a predetermined sorting motion. The moveable plate 802 is a plate sieve and comprises openings which are smaller than the smallest grain size of the granular matter to be sorted and so only allows liquid to pass through. As a result, the moveable plate 802 moves the granular matter to be sorted upwards during an upstroke, causing grains of the matter to be sorted to move relative to the liquid and other grains of the matter to be sorted. On the downstroke, the moveable plate 802 generates downwards movement in the grains of the granular matter to be sorted, which causes the grains to move relative to the liquid and other grains of the matter to be sorted. This movement and relative motion of the grains of the matter to be sorted enables the grains to settle according to their respective densities and so results in the stratification and sorting of the grains according to density.

Figure 9:
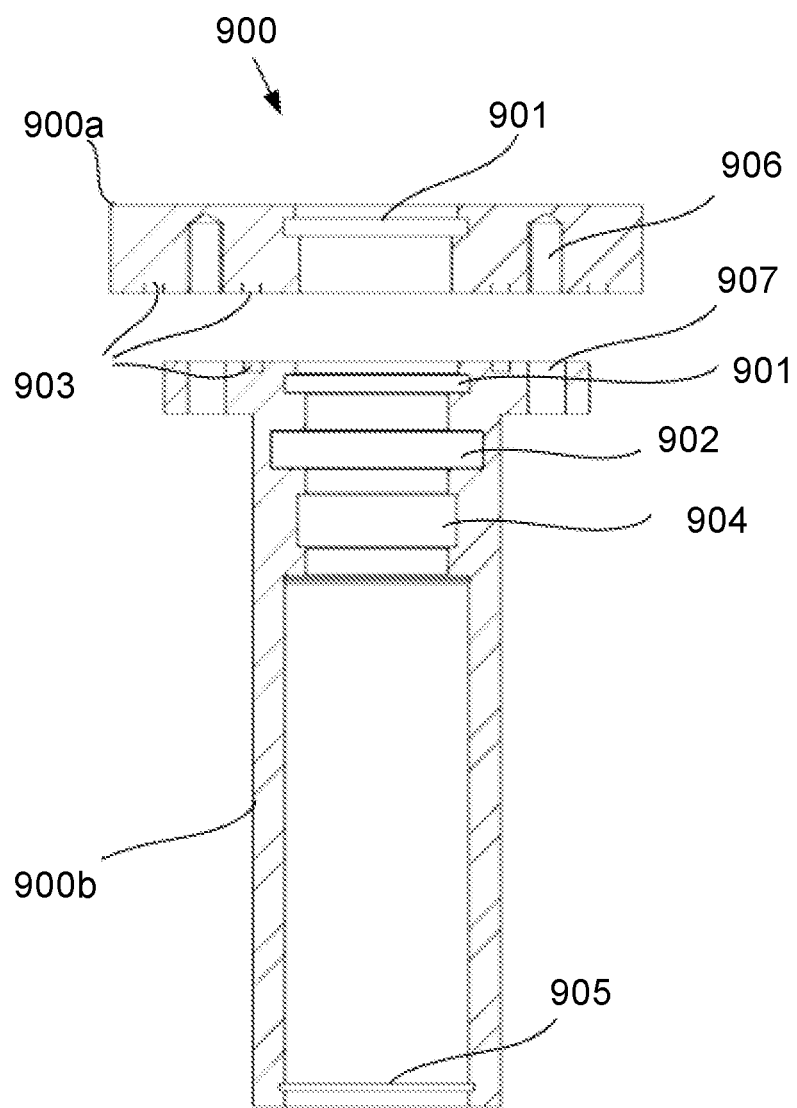
FIG. 9 is a longitudinal cross-sectional view of a chamber seal for use in the stratification or sorting system of FIG. 8 according to a first example embodiment.

FIG. 9 is a longitudinal cross-sectional view of a chamber seal 900 for use in the stratification or sorting system machine or apparatus of FIG. 8 according to a first example embodiment. The chamber seal 900 in this embodiment is made from two pieces in the form of a top housing body 900*a* and a bottom housing body 900*b*. The top housing body 900*a* comprises a wiper seal 901 which seals against the shaft 805 when installed to prevent contaminants from the stratification or sorting chamber 800 from entering the chamber seal 900 between the shaft 805 and the chamber seal 900. To seal against a base 812 of the stratification or sorting chamber 800 and prevent liquid or the like from leaking between the chamber seal 900 and the stratification or sorting chamber 800, the top housing body 900*a* comprises a pair of o-rings 903 placed in corresponding grooves. To secure the top housing body 900*a* it is provided with a series of threaded holes 906 which match the through holes 907 of the bottom housing body 900*b*. At its top, the bottom housing body 900*b* comprises an o-ring 903 for sealing against the bottom of the base 812 of the stratification or sorting chamber 800. Below this a wiper seal 901 is arranged to seal against the shaft 805 and further prevent contaminants from entering the bottom housing body 900*b*. A rod seal 902 is provided below this, which seals between the shaft 805 and bottom housing body 900*b*. To assist in guiding the shaft 805 a guide ring 904 is located below the rod seal 902 and above the linear ball bearings (not shown). The linear ball bearings also aid in guiding the shaft 805 and improve the efficiency of the shaft motion. At the bottom of the bottom housing body 905, below the linear ball bearings (not shown), a retaining element 905 in the form of a retaining ring is located to secure the assembly inside the bottom housing body 900*b*.

In this embodiment, the chamber seal 900 is secured to the stratification or sorting chamber 800 by aligning the top housing body 900*a* on top of the opening in the base 812 and then aligning the bottom housing body 900b with the bottom of the opening in the base 812, such that the threaded holes 906 and the through holes 907 of the top and bottom housing body 900a and 900b respectively also align, and then passing a bolt through each of the through holes 907 and securing them in the corresponding threaded holes 906.

Figure 10:
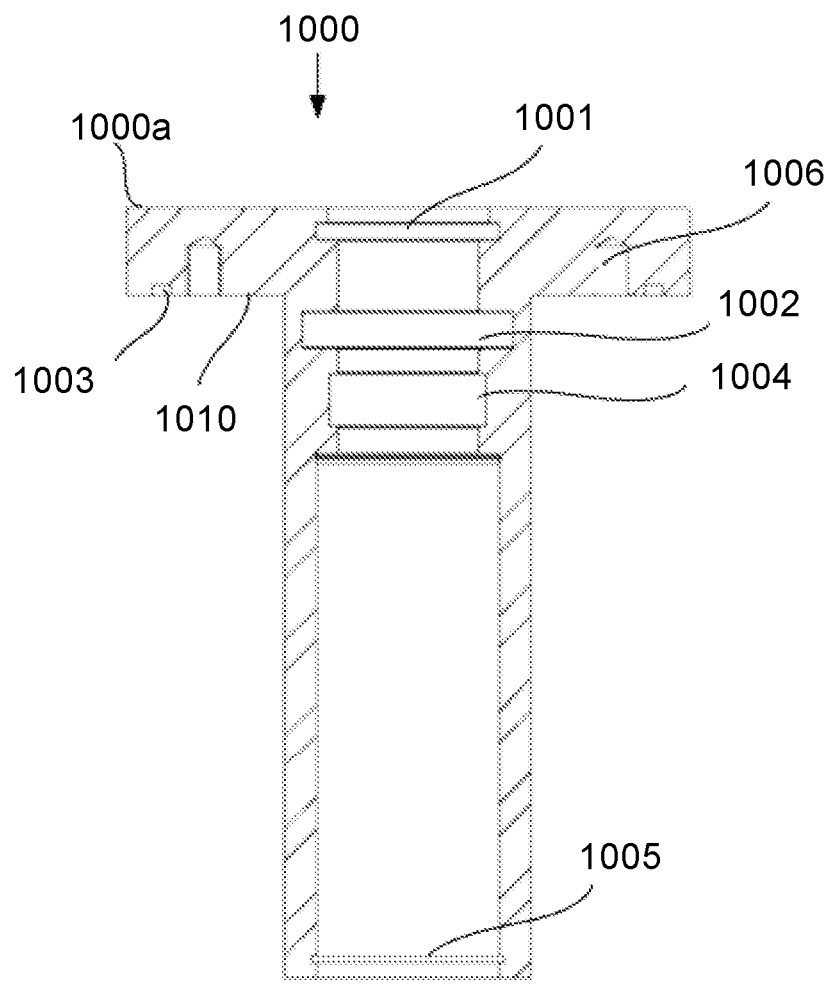
FIG. 10 is a longitudinal cross-sectional view of a chamber seal for use in the stratification or sorting system of FIG. 8 according to a second example embodiment.

FIG. 10 is a longitudinal cross-sectional view of a chamber seal 1000 for use in the stratification or sorting machine or apparatus of FIG. 8 according to a second example embodiment. The chamber seal 1000 comprises just one housing body 1000a. It comprises an o-ring 1003 for sealing against the top of the base 812 of the stratification or sorting chamber 800. Similar to the chamber seal 900, the chamber seal 1000 comprises a wiper seal 1001, a rod seal 1002, a guide ring 1004, linear ball bearings (not shown) and a retaining element 1005 in the form of a retaining ring at the bottom of the housing body 1000a, all of which perform the same functions as described above for the chamber seal 900.

In this embodiment the chamber seal 1000 is secured to the stratification or sorting chamber 800, by sliding the housing body 1000a through the opening in the base 812 from the top such that the flange 1010 abuts the top of the base 812 and the threaded holes 1006 align with corresponding holes extending through the base 812, and then securing a bolt in the threaded holes 1006 through the corresponding holes in the base 812.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:
   a stratification or sorting chamber for holding the combination of liquid and granular matter, said stratification or sorting chamber having one or more side walls;
   a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and
   a drive system for moving the movable plate in vertical upwards and downwards movements within the stratification or sorting chamber to thereby exercise or treat the granular matter within the liquid.

2. A system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:
   a stratification or sorting chamber for holding the combination of liquid and granular matter, said stratification or sorting chamber having one or more side walls;
   a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and
   a drive system for moving the movable plate in vertical upwards and downwards movements within the stratification or sorting chamber to thereby exercise or treat the granular matter within the liquid,
   wherein the movable plate is positioned at a distance above a bottom part below the side wall(s) of the stratification or sorting chamber thereby defining a lower chamber part between an upper surface of said bottom part and a lower surface of the movable plate, said lower chamber part having a change in volume by upwards or downwards movement of the movable plate within the stratification or sorting chamber; characterized in that the stratification machine further comprises a fluid compensation system being fluidly connected to the lower chamber part and configured for delivering and receiving a liquid to and from said lower chamber part, whereby liquid can be supplied to the lower chamber part when the volume of the lower chamber part is increased and liquid can be received from the lower chamber part when the volume of the lower chamber part is decreased.

3. A system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:
   a stratification or sorting chamber for holding the combination of liquid and granular matter, said stratification or sorting chamber having one or more side walls;
   a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and
   a drive system for moving the movable plate in vertical upwards and downwards movements within the stratification or sorting chamber to thereby exercise or treat the granular matter within the liquid, wherein the drive system comprises one or more means for:
   a) moving the movable plate in accordance with a stratification or sorting motion comprising a series of vertical upstrokes and vertical downstrokes through the liquid in the stratification or sorting chamber;

b) pausing the movements of the moveable plate between completing a downwards movement or downstroke and initiating an upwards movement or upstroke of the movable plate, optionally providing for pausing for at least 0.5 seconds, such as at least 1 second, or such as at least 1.5 seconds; optionally providing for adjusting the length of the pause;

c) pausing the movements of the moveable plate between completing an upwards movement or upstroke and initiating a downwards movement or downstroke of the movable plate, optionally providing for pausing for at least 0.5 seconds, such as at least 1 second, or such as at least 1.5 seconds; optionally providing for adjusting the length of the pause;

d) adjusting the acceleration of an upwards or downwards movement of the movable plate, and/or for adjusting the velocity of an upwards or downwards movement of the movable plate;

e) adjusting the amplitude of the movements of the movable plate, optionally according to the ratio of volume of granular matter to be sorted to the volume of the liquid in the stratification or sorting chamber, optionally wherein the movable plate can move between a lower or resting position and a first maximum upper position, and wherein optionally the first maximum upper position is selected so that the granular matter is submerged in the liquid when the movable plate is at the first maximum upper position;

f) discharging the granular matter from the liquid within the stratification chamber; optionally for discharging an uppermost layer of the granular matter by lifting the matter above the surface of the liquid within the stratification chamber, wherein optionally the discharge system is configured for repeatedly discharging the uppermost layer of the granular matter; wherein optionally the drive system is configured for lifting the movable plate upwards to a discharging height, for which at least part of or all of the granular matter is lifted above the surface of the liquid within the stratification chamber; and/or g) identifying granular matter of different densities, optionally for identifying changes in density between fractions of granular matter being output from the discharging system.

4. A system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:

a stratification or sorting chamber for holding the combination of liquid and granular matter, said stratification or sorting chamber having one or more side walls;

a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and a drive system for moving the movable plate in vertical upwards and downwards movements within the stratification or sorting chamber to thereby exercise or treat the granular matter within the liquid, wherein the movable plate is positioned at a distance above a bottom part below the side wall(s) of the stratification or sorting chamber thereby defining a lower chamber part between an upper surface of said bottom part and a lower surface of the movable plate, said lower chamber part having a change in volume by upwards or downwards movement of the movable plate within the stratification chamber; and wherein optionally liquid is supplied to the lower chamber part when the volume of the lower chamber part is increased by the upwards movements of the movable plate and liquid is received from the lower chamber part when the volume of the lower chamber part is decreased by the downwards movements of the movable plate.

5. A method for treating a combination of a liquid and granular matter comprising:

a) providing the system of claim 1;

b) providing two or more types of granular matter with different densities and a liquid, wherein at the least two of said two or more types of granular matter have densities being larger than the density of the liquid;

c) combining the granular matter with the liquid in the stratification or sorting chamber of the system;

d) providing a series of upwards and downwards movements of the granular matter within the liquid; wherein for at least part of said upwards and/or downwards movements there is a resting period from the end of the upwards and/or downwards movement for settlement of the granular matter within the liquid before initiating a new upwards and/or downwards movement of the granular matter within the liquid; and e) optionally adjusting the amplitude, the acceleration, the velocity and/or the duration of the resting period of the upward and/or downward movements.

6. The method of claim 5 further characterised in that said series of upwards and downwards movements of the granular matter within the liquid is divided in at least a first and a second series of upwards and downwards movements, wherein for at least part of the upwards and downwards movements for both the first and second series of said movements there is a resting period from the end of the upwards and/or downwards movement for settlement of the granular matter within the liquid before initiating a new upwards and/or downwards movement of the granular matter within the liquid; and wherein said resting period differs from the first series of movements to the second series of movement, and/or wherein the amplitude, the acceleration, the velocity and/or the duration of the resting period of the first series of the upwards and/or downwards movements differ from the amplitude, the acceleration, the velocity and/or the duration of the resting period of the second series of the upwards and/or downwards movements.

7. The method according to claim 6, said method further comprising a discharging process, wherein at least part of or all of the treated granular matter are separated from the liquid.

8. A method for treating a combination of a liquid and granular matter comprising:

a) providing a system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:
  a stratification or sorting chamber for holding the combination of liquid and granular matter, said stratification or sorting chamber having one or more side walls;
  a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and
  a drive system for moving the movable plate in vertical upwards and downwards movements within the stratification or sorting chamber to thereby exercise or treat the granular matter within the liquid;
b) providing two or more types of granular matter with different densities and a liquid, wherein at the least two of said two or more types of granular matter have densities being larger than the density of the liquid;
c) combining the granular matter with the liquid in the stratification or sorting chamber of the system;
d) providing a series of upwards and downwards movements of the granular matter within the liquid; wherein for at least part of said upwards and/or downwards movements there is a resting period from the end of the upwards and/or downwards movement for settlement of the granular matter within the liquid before initiating a new upwards and/or downwards movement of the granular matter within the liquid;
e) optionally adjusting the amplitude, the acceleration, the velocity and/or the duration of the resting period of the upward and/or downward movements; and
f) providing a discharging process,
wherein said series of upwards and downwards movements of the granular matter within the liquid is divided in at least a first and a second series of upwards and downwards movements,
wherein for at least part of the upwards and downwards movements for both the first and second series of said movements there is a resting period from the end of the upwards and/or downwards movement for settlement of the granular matter within the liquid before initiating a new upwards and/or downwards movement of the granular matter within the liquid; and
wherein said resting period differs from the first series of movements to the second series of movement, and/or
wherein the amplitude, the acceleration, the velocity and/or the duration of the resting period of the first series of the upwards and/or downwards movements differ from the amplitude, the acceleration, the velocity and/or the duration of the resting period of the second series of the upwards and/or downwards movements,
wherein at least part of or all of the treated granular matter are separated from the liquid, and
wherein the granular matter is lifted upwards to a height, for which height at least part of or all of the granular matter is lifted above the surface of the liquid within the stratification chamber.

9. The method according to claim 5, wherein said resting period has a minimum length is at least 0.5 seconds, such as at least 1 second, such as at least 1.5 seconds.

10. The method according to claim 5, wherein said first series of movements are performed before the second series of movements, and wherein
  a) the resting period of the first series of movement is longer or shorter than the resting period of the second series of movements;
  b) the amplitude, the acceleration, and/or the velocity of the upwards or downwards movements of the first series of movements is larger or smaller than the amplitude, the acceleration, and/or the velocity of the upwards and/or downwards movements of the second series of movements; and/or
  c) the total duration of treating the combination of the liquid and granular matter by the first series of movements is shorter, longer or equal to the total duration of treating the combination of the liquid and granular matter by the second series of movements.

11. A method for treating a combination of a liquid and granular matter comprising:
  a) providing a system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:
    a stratification or sorting chamber for holding the combination of liquid and granular matter, said stratification or sorting chamber having one or more side walls;
    a movable plate arranged within the stratification or sorting chamber, where the moveable plate has an outer edge or edges being closely positioned to the one or more side walls of the stratification or sorting chamber with any distances between the outer edge(s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and
    a drive system for moving the movable plate in vertical upwards and downwards movements within the stratification or sorting chamber to thereby exercise or treat the granular matter within the liquid;
  b) providing two or more types of granular matter with different densities and a liquid, wherein at the least two of said two or more types of granular matter have densities being larger than the density of the liquid;
  c) combining the granular matter with the liquid in the stratification or sorting chamber of the system;
  d) providing a series of upwards and downwards movements of the granular matter within the liquid; wherein for at least part of said upwards and/or downwards movements there is a resting period from the end of the upwards and/or downwards movement for settlement of the granular matter within the liquid before initiating a new upwards and/or downwards movement of the granular matter within the liquid; and e) optionally adjusting the amplitude, the acceleration, the velocity and/or the duration of the resting period of the upward and/or downward movements, wherein the grain size ratio between the smallest and largest grains of the least two types of granular matter is between of 1:1 to 1:100.

12. The method according to claim 5, further comprising moving the movable plate in vertical upwards and downwards movements within the stratification or sorting chamber to thereby provide said series of upwards and downwards movements of the granular matter within the liquid.

13. The method according to claim 4, wherein the movement of the movable plate is controlled to be between a lower or resting position and a predetermined first maximum upper position; and wherein the first maximum upper position is determined based on the amount of liquid and granular matter within the stratification chamber, to thereby ensure that the granular matter is submerged in the liquid when the movable plate reaches the first maximum upper position.

14. The method according to claim 8, wherein for separating the granular matter from the liquid, the movable plate is moved upwards to a discharging height, for which height all of the granular matter is lifted above the surface of the liquid within the stratification chamber.

15. The method according to claim 14, wherein the discharging process comprises removing from the stratification chamber an uppermost layer of the granular matter being lifted above the surface of the liquid.

16. A method for treating a combination of a liquid and granular matter comprising:

a) providing a system for treating a combination of a liquid and granular matter, said granular matter being larger than or equal to a minimum grain size and comprising two or more types of granular matter with different densities, wherein at least two of said two or more types of granular matter have densities being larger than the density of the liquid, wherein the system comprises a stratification machine comprising:

a stratification or sorting chamber for holding the combination of liquid and granular matter, said stratification or sorting chamber having one or more side walls;

a movable plate arranged within the stratification or sorting chamber, where the moveable plate has an outer edge or edges being closely positioned to the one or more side walls of the stratification or sorting chamber with any distances between the outer edge (s) and the one or more sidewalls being smaller than the minimum grain size of the granular matter to be treated, and where the moveable plate is a plate sieve with sieve openings smaller than the minimum grain size of the granular matter to be treated to thereby maintain the granular matter above or on top of the movable plate; and a drive system for moving the movable plate in vertical upwards and downwards movements within the stratification or sorting chamber to thereby exercise or treat the granular matter within the liquid;

b) providing two or more types of granular matter with different densities and a liquid, wherein at the least two of said two or more types of granular matter have densities being larger than the density of the liquid;

c) combining the granular matter with the liquid in the stratification or sorting chamber of the system;

d) providing a series of upwards and downwards movements of the granular matter within the liquid; wherein for at least part of said upwards and/or downwards movements there is a resting period from the end of the upwards and/or downwards movement for settlement of the granular matter within the liquid before initiating a new upwards and/or downwards movement of the granular matter within the liquid; and e) optionally adjusting the amplitude, the acceleration, the velocity and/or the duration of the resting period of the upward and/or downward movements, wherein a surface-active agent is added to or is part of the liquid being provided to be used for the combination.

* * * * *